United States Patent
Usuda et al.

(10) Patent No.: US 7,813,754 B2
(45) Date of Patent: Oct. 12, 2010

(54) TRANSFER RATE CONTROL METHOD, TRANSMISSION POWER CONTROL METHOD, TRANSMISSION POWER RATIO CONTROL METHOD, MOBILE COMMUNICATION SYSTEM, MOBILE STATION, AND RADIO BASE STATION

(75) Inventors: Masafumi Usuda, Shinagawa-ku (JP); Anil Umesh, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 668 days.

(21) Appl. No.: 11/629,677

(22) PCT Filed: Jun. 17, 2005

(86) PCT No.: PCT/JP2005/011153

§ 371 (c)(1),
(2), (4) Date: Apr. 5, 2007

(87) PCT Pub. No.: WO2005/125259

PCT Pub. Date: Dec. 29, 2005

(65) Prior Publication Data

US 2008/0032725 A1 Feb. 7, 2008

(30) Foreign Application Priority Data

Jun. 17, 2004 (JP) ............................. 2004-180272
Aug. 11, 2004 (JP) ............................. 2004-234882

(51) Int. Cl.
*H04Q 7/20* (2006.01)
(52) U.S. Cl. .................. 455/522; 455/69; 455/500; 455/517; 455/509; 455/450; 375/225; 370/230; 370/232; 370/234; 370/310; 370/329

(58) Field of Classification Search ................. 455/522, 455/69, 127.1, 450–453, 509, 500, 517, 445, 455/422.1, 403, 466, 426.1, 426.2, 550.1; 375/225; 370/230, 232, 234, 310, 329, 338, 370/343
See application file for complete search history.

(56) References Cited

U.S. PATENT DOCUMENTS

| 6,738,640 | B1 | 5/2004 | Baker et al. | |
| 7,539,165 | B2* | 5/2009 | Toskala et al. | ............... 370/335 |
| 2003/0073443 | A1* | 4/2003 | Bae et al. | .................... 455/450 |

FOREIGN PATENT DOCUMENTS

| CN | 1302486 A | 7/2001 |
| CN | 1394020 A | 1/2003 |
| JP | 11 150761 | 6/1999 |

(Continued)

*Primary Examiner*—Keith T Ferguson
(74) *Attorney, Agent, or Firm*—Oblon, Spivak, McClelland, Maier & Neustadt, L.L.P.

(57) ABSTRACT

The present invention relates to a transmission rate control method of controlling a transmission rate of uplink user data to be transmitted from a mobile station to a radio base station. The method includes: starting to transmit at the mobile station, the uplink user data at an initial transmission rate which is informed from a network or an initial transmission rate which has been already informed from the network; and increasing at the mobile station the transmission rate of the uplink user data, up to a predetermined transmission rate, on a basis of a increase rule of the transmission rate which is beforehand determined.

42 Claims, 29 Drawing Sheets

FOREIGN PATENT DOCUMENTS

| | | |
|---|---|---|
| JP | 11 177488 | 7/1999 |
| JP | 2001 217799 | 8/2001 |
| JP | 2003-204299 | 7/2003 |
| JP | 2003-304195 | 10/2003 |
| WO | 02 47361 | 6/2002 |

* cited by examiner

FIG. 14

| RATE LEVEL | CURRENT TRANSMISSION RATE (kbps) | NEXT-TIME MAXIMUM ALLOWABLE TRANSMISSION RATE (kbps) |
|---|---|---|
| 1 | NOT LOWER THAN ZERO, BUT LOWER THAN 32 | 32 |
| 2 | NOT LOWER THAN 32, BUT LOWER THAN 64 | 64 |
| 3 | NOT LOWER THAN 64, BUT LOWER THAN 128 | 128 |
| 4 | NOT LOWER THAN 128, BUT LOWER THAN 256 | 256 |
| 5 | NOT LOWER THAN 256, BUT LOWER THAN 512 | 512 |
| 6 | NOT LOWER THAN 512, BUT LOWER THAN 768 | 768 |
| 7 | NOT LOWER THAN 768, BUT LOWER THAN 1024 | 1024 |
| 8 | NOT LOWER THAN 1024, BUT LOWER THAN 1280 | 1280 |
| 9 | NOT LOWER THAN 1280, BUT NOT HIGHER THAN 1536 | 1536 |

| TRANSMISSION POWER LEVEL | TRANSMISSION POWER (dBm) | NEXT-TIME MAXIMUM ALLOWABLE TRANSMISSION POWER (dBm) |
|---|---|---|
| 1 | NOT LOWER THAN −50, BUT LOWER THAN −47 | −47 |
| 2 | NOT LOWER THAN −47, BUT LOWER THAN −44 | −44 |
| 3 | NOT LOWER THAN −44, BUT LOWER THAN −41 | −41 |
| ⋮ | ⋮ | ⋮ |
| 25 | NOT LOWER THAN 22, BUT LOWER THAN 24 | 24 |

| TRANSMISSION POWER RATIO LEVEL | TRANSMISSION POWER RATIO (dB) | NEXT-TIME MAXIMUM ALLOWABLE TRANSMISSION POWER RATIO (dB) |
|---|---|---|
| 1 | NOT LOWER THAN −3, BUT LOWER THAN ZERO | 0 |
| 2 | NOT LOWER THAN ZERO, BUT LOWER THAN 3 | 3 |
| 3 | NOT LOWER THAN 3, BUT LOWER THAN 6 | 6 |
| ⋮ | ⋮ | ⋮ |
| 25 | NOT LOWER THAN 18, BUT LOWER THAN 21 | 24 |

| MOBILE STATION ID | BASE STATION MAXIMUM ALLOWABLE TRANSMISSION RATE (kbps) |
|---|---|
| 0001 | 1536 |
| 0002 | 1280 |
| ... | ... |

(b)

| MOBILE STATION ID | BASE STATION MAXIMUM ALLOWABLE TRANSMISSION POWER (dB) |
|---|---|
| 0001 | -47 |
| 0002 | -44 |
| ... | ... |

(c)

| MOBILE STATION ID | BASE STATION MAXIMUM ALLOWABLE TRANSMISSION POWER RATIO (dBm) |
|---|---|
| 0001 | 0 |
| 0002 | 3 |
| ... | ... |

| PRIORITY | BASE STATION MAXIMUM ALLOWABLE TRANSMISSION RATE (kbps) |
|---|---|
| 1 | 1536 |
| 2 | 1280 |
| ... | ... |

(b)

| PRIORITY | BASE STATION MAXIMUM ALLOWABLE TRANSMISSION POWER (dB) |
|---|---|
| 1 | −47 |
| 2 | −44 |
| ... | ... |

(c)

| PRIORITY | BASE STATION MAXIMUM ALLOWABLE TRANSMISSION POWER RATIO (dBm) |
|---|---|
| 1 | 0 |
| 2 | 3 |
| ... | ... |

TRANSFER RATE CONTROL METHOD, TRANSMISSION POWER CONTROL METHOD, TRANSMISSION POWER RATIO CONTROL METHOD, MOBILE COMMUNICATION SYSTEM, MOBILE STATION, AND RADIO BASE STATION

TECHNICAL FIELD

The present invention relates to a transmission rate control method of controlling a transmission rate of uplink user data to be transmitted from a mobile station to a radio base station, and to a mobile communications system, a mobile station and a radio base station which realize the transmission rate control method.

In addition, the present invention relates to a transmission power control method of controlling transmission power of uplink user data to be transmitted from a mobile station to a radio base station, and to a mobile communications system, a mobile station and a radio base station which realize the transmission power control method.

Furthermore, the present invention relates to a transmission power ratio control method of controlling a transmission power ratio of uplink user data to be transmitted from a mobile station to a radio base station, and relates to a mobile communications system, a mobile station and radio base station, which realize the transmission power ratio control method.

BACKGROUND ART

In the conventional mobile communications system, the radio network controller RNC is configured to determines the transmission rate of uplink user data, by taking into consideration hardware resources for reception (hereinafter referred to as "hardware resources") of the radio base station NodeB, uplink radio resources (an amount of uplink interference), transmission power of the mobile station UE, transmission process performance of the mobile station UE transmission rate required by a higher application, and the like; and to inform the mobile station UE and the radio base station NodeB of the determined transmission rate of the uplink user data as a Layer 3 (Radio Resource Control Layer) massage, when establishing a dedicated physical channel between a mobile station UE and a radio base station NodeB, In this respect, the radio network controller RNC is an apparatus which provided in the higher position than the radio base station NodeB, and to control the radio base station NodeB and the mobile station UE.

Traffic occurs in a burst manner more often in data communications than in voice communications and TV communications. If possible, it is desirable that a transmission rate of uplink user data be changed at a high speed in data communications.

In the conventional mobile communications system however there is a problem that it is hard to control change of transmission rate of uplink user data at a high speed (for example, at a speed of approximately 1 microsecond to 100 microseconds), because the radio network controller RNC usually controls many radio base stations NodeB jointly, and it is assumed that process loads and process delays in the radio network controller RNC are increased.

In the mobile communications system, there is another problem that implementation costs of the apparatus and operating costs of the network run high, even though the change of transmission rate of uplink user data can be controlled at a high speed.

For these reasons, a usual practice of the conventional mobile communications system is to control the change of transmission rate of uplink user data at a speed of the order of several hundred microseconds to several seconds.

As a result, in the case where the conventional mobile communications system carries out data transmission in a burst manner, as shown in FIG. 2(a), it transmits data with accepting a low speed transmission, long transmission delays and low transmission efficiency, as shown in FIG. 2(b), or it transmits data with securing radio resources for high-speed transmission and accepting that radio band resources of available time and hardware resources of the radio base station NodeB are wasted, as shown in FIG. 2(c).

Note that, in FIG. 2, the axis of ordinates is denominated as both uplink radio resources and hardware resources.

In the 3rd Generation Partnership Project (3GPP) and the 3rd Generation Partnership Project 2 (3GPP2), which are international standardization groups for the third generation mobile communications system, high-speed uplink radio resource control methods in Layer 1 and Media Access Control (MAC) sublayer (Layer 2) between a radio base station NodeB and a mobile station UE have been examined, for the purpose of effectively using uplink radio resources. Hereinafter, the examination and functions examined there will be collectively referred to as "Enhanced Uplink (EUL)".

In this respect, the uplink radio resource control methods which have been under examination within the "Enhanced Uplink" are roughly classified into the following three categories.

As a first uplink radio resource control method, "Time & Rate Control" is known.

As shown in FIGS. 3(a) and 3(b), in the "Time & Rate Control", at a predetermined timing, a radio base station NodeB is configured to determine a mobile station UE which is allowed to transmit uplink user data to the radio base station NodeB and a transmission rate of the uplink user data; and to notify a mobile station ID for identifying the determined mobile station UE and the determined transmission rate of the uplink user data (or a maximum allowable transmission rate of the uplink user data).

And, in the "Time & Rate Control", the mobile station UE is configured to transmit the uplink user data to the radio base station NodeB, at the predetermined timing and at the determined transmission rate of the uplink user data (or at a transmission rate within a range of the maximum allowable transmission rate of the uplink user data).

Otherwise, at a predetermined timing, the radio base station NodeB is configured to determine a mobile station UE which is allowed to transmit the uplink user data to the radio base station NodeB; to determine a transmission power of the uplink user data (or a transmission power ratio of an enhanced dedicated physical data channel (E-DPDCH) to a dedicated physical control channel (DPCCH) (hereinafter referred to as a "transmission power ratio")), instead of determining the transmission rate of the uplink user data; and to notify a mobile station ID for identifying the determined mobile station UE and the determined transmission power of the uplink user data (or the determined transmission power ratio).

And, the mobile station UE is configured to determine the transmission rate of the uplink user data based on the notified transmission power of the uplink user data (or the notified transmission power ratio); and to transmit the uplink user data to the radio base station NodeB, at the predetermined timing, and at the determined transmission rate of the uplink user data.

As a second uplink radio resource control methods, "Rate Control" is known.

As shown in FIGS. 4(a) and 4(b), in the "Rate Control", when there are uplink user data to be transmitted in a mobile station UE, the mobile station UE is configured to transmit the uplink user data to a radio base station NodeB.

In this respect, the radio base station NodeB is configured to determine a maximum allowable transmission rate, a maximum allowable transmission power or a maximum allowable transmission power ratio of the uplink user data, per one or more transmission time intervals (TTIs) of uplink user data, and to inform the mobile station UE of the determined one.

In this case, the radio base station NodeB is usually configured to inform the mobile station UE of a relative value to the maximum allowable transmission rate, the maximum allowable transmission power or the maximum allowable transmission power ratio (for example, a binary value representing UP command/Down command) at the present timing.

It should be noted that, in this case, the radio base station NodeB may be configured to assign a specific maximum allowable transmission rate, a specific maximum allowable transmission power or a specific maximum allowable transmission power ratio to each of mobile stations UE, or to assign a single maximum allowable transmission rate, a single maximum allowable transmission power or a single maximum allowable transmission power ratio to the entire cell.

Alternately, the radio base station NodeB may be configured to choose arbitrarily whether to assign a specific maximum allowable transmission rate, a specific maximum allowable transmission power or a specific maximum allowable transmission power ratio to each mobile station UE, or assign a single maximum allowable transmission rate, a single maximum allowable transmission power or a single maximum allowable transmission power ratio to the entire cell.

Note that a coefficient used for calculating the maximum allowable transmission rate, the maximum allowable transmission power or the maximum allowable transmission power ratio may be used instead of the maximum allowable transmission rate, the maximum allowable transmission power or the maximum allowable transmission power ratio.

As a third uplink radio resource control methods, "Autonomous Transmission" is known.

In the "Autonomous Transmission", when there are uplink user data to be transmitted in a mobile station UE, the mobile station UE is configured to transmit the uplink user data to a radio base station NodeB whenever the mobile station UE has the uplink user data, whereas a maximum allowable transmission rate of the uplink user data is determined by the mobile communications system.

As described above, in the "Time & Rate Control" and the "Rate Control", Layer 1 or MAC sublayer, which is provided to the radio base station NodeB, can control a transmission rate of the uplink user data at a high speed, so as to use uplink radio resources effectively, and to improve throughputs in the cell.

In the conventional "Time & Rate Control" however, the radio base station NodeB has to grasp whether or not each mobile station UE has uplink user data to be transmitted, what amount of uplink user data each mobile station UE needs to transmit, and the like. For this reason, periodically or whenever a predetermined event occurs, each mobile station UE is required to send such information to the radio base station NodeB via uplink control data.

By use of such information, the radio base station NodeB needs to assign adequate hardware resources for reception of uplink user data. For this reason, the radio base station NodeB needs to be provided with a control process for such an assignment. Therefore, there is a problem of making hardware configuration or software configuration of the radio base station NodeB more complicated, or a problem of prolonging a time needed to process the reception of the uplink user data.

Furthermore, in the conventional "Time & Rate Control", every mobile station UE located in the same cell is configured to transmit its uplink control data to the radio base station NodeB Therefore, there is a problem that the uplink channel capacity runs short.

Moreover, in the conventional "Time & Rate Control", the radio base station NodeB needs to transmit downlink control data for assigning uplink radio resources to each of the mobile stations UE existing in the same cell. Therefore, there is a problem that the downlink channel capacity runs short as well.

In addition, in the conventional "Time & Rate Control", there is a problem that, when a reception error occurs in downlink control data, uplink radio resources which have been used to transmit uplink control data comes in vein.

Furthermore, in the conventional "Rate Control", a signal for controlling the transmission rate of uplink user data needs to be transmitted via the downlink. Therefore, there is a problem that the downlink channel capacity runs short.

To ease these problems, examinations have been made for a method of controlling the maximum allowable transmission rate, the maximum allowable transmission power or the maximum allowable transmission power ratio of uplink user data, which can be realized by use of UP command/Down command (a one-bit command). However, there is a problem that an disagreement between a transmission rate of uplink user data recognized by the radio base station NodeB and a transmission rate of the uplink user data recognized by the mobile station UE occurs, and, in some cases, the radio base station NodeB fails to receive uplink user data transmitted by the mobile station UE, or a transmission rate of uplink user data which has been assigned by the radio base station NodeB is not implemented and the use of the u-link radio resources for the transmission comes in vain, in the case where a bit error occurs in such a command.

Furthermore, in the conventional "Rate Control", there is a problem that, if the radio base station NodeB controls the maximum allowable transmission rate, the maximum allowable transmission power or the maximum allowable transmission power ratio of uplink user data by transmitting a single UP command/Down command to all the mobile stations UE throughout the cell, this control hinders the assignment of the uplink radio resources among the mobile stations UE from being equal.

Suppose that, as shown in FIG. 5, there are a mobile station UE#1 which has started to transmit data first, and a mobile station UE#2 has started to transmit data later, in a certain cell. When uplink radio resources are still available in the cell, the radio base station NodeB transmits an UP command. For this reason, uplink radio resources assigned to each of the mobile stations UE#1 and UE#2 become large in amount with lapse of time Finally, all the uplink radio resources in the cell are used up.

In this occasion, because the mobile station UE#2 starts to transmit data later than the mobile station UE#1 does, the mobile station UE#2 receives a smaller number of UP commands from the radio base station NodeB than the mobile station UE#1 does, and the uplink radio resources assigned to the mobile station UE#2 is smaller in number than those assigned to the mobile station U#1. As a result, there is a problem that the assignment of uplink radio resources is not equal between the mobile stations.

Furthermore, in the conventional "Rate Control", when a method of informing the entire cell of the maximum allowable transmission rate, the maximum allowable transmission power or the maximum allowable transmission power ratio of uplink user data (or the coefficients used for calculating the maximum allowable transmission rate, the maximum allowable transmission power or the maximum allowable transmission power ratio of uplink user data) is used (hereinafter, referred to as a "cell common rate control method"), there is a problem as follows. Even if actual traffic is small in amount, in a case where mobile stations UE connected to the radio base station NodeB are large in number a larger amount of hardware resources need to be made available in the radio base station NodeB, and this increases the reception buffer capacity of the radio base station NodeB. As a result, this increases equipment costs.

In other words, since all the mobile stations UE connected to the cell use the maximum allowable transmission rate, the maximum allowable transmission power or the maximum allowable transmission power ratio (or the coefficients for calculating the maximum allowable transmission rate, the maximum allowable transmission power or the maximum allowable transmission power ratio) which is common among the mobile stations UE, in the cell common rate control method, there is a problem that the radio base station NodeB needs to make the same amount of hardware resources available for a mobile station UE with a smaller amount of traffic as for a mobile station UE with a larger amount of traffic.

Moreover, the conventional "Autonomous Transmission" has been examined as its combination with the "Time & Rate Control" or as its combination with "Rate Control". The conventional "Autonomous Transmission" is not capable of controlling a maximum allowable transmission rate of uplink user data by use of Layer 1 or MAC sublayer. For this reason, in the conventional "Autonomous Transmission", a transmission rate of uplink user data needs to be controlled by use of Layer 3, which is provided to the radio network controller RNC, as in the case of the prior art. As a result, it is not expected that the conventional "Autonomous Transmission" improves the effective use of uplink radio resources by itself.

DISCLOSURE OF THE INVENTION

The present invention has been made with the foregoing points taken into consideration. An object of the present invention is to provide a transmission rate control method, a transmission power control method, a transmission power ratio control method, a mobile communications system, a mobile station and a base station which make it possible to increase uplink throughput without the uplink channel capacity or the downlink channel capacity running short.

Another object of the present invention is to realize the "cell common rate control method", known as a simple transmission rate control method, while holding assignment of hardware resources at as minimum a level as necessary, so as to reduce the hardware resources in use, and to cut back on equipment costs.

A first aspect of the present invention is summarized as a transmission rate control method of controlling a transmission rate of uplink user data to be transmitted from a mobile station to a radio base station, including: starting to transmit, at the mobile station, the uplink user data, at an initial transmission rate which is informed from a network or an initial transmission rate which has been already informed from the network; and increasing at the mobile station, the transmission rate of the uplink user data, up to a predetermined transmission rate, on a basis of a increase rule of the transmission rate which is beforehand determined.

A second aspect of the present invention is summarized as a transmission power control method of controlling a transmission power of uplink user data to be transmitted from a mobile station to a radio base station, including starting to transmit, at the mobile station, the uplink user data, at an initial transmission power which is informed from a network or an initial transmission power which has been already informed from the network; and increasing, at the mobile station, the transmission power of the uplink user data, up to a predetermined transmission power, on a basis of a increase rule of the transmission power which is beforehand determined.

A third aspect of the present invention is summarized as a transmission power ratio control method of controlling a transmission power ratio of uplink user data to be transmitted from a mobile station to a radio base station; wherein the transmission power ratio of the uplink user data is a ratio of a transmission power of an enhanced dedicated physical data channel of the uplink user data to a transmission power of a dedicated physical data channel of the uplink user data; and the method including: starting to transmit, at the mobile station, the uplink user data, at an initial transmission power ratio which is informed from a network or an initial transmission power ratio which has been already informed from the network; and increasing, at the mobile station, the transmission power ratio of the uplink user data, up to a predetermined transmission power ratio, on a basis of a increase rule of the transmission power ratio which is beforehand determined.

A fourth aspect of the present invention is summarized as a mobile communications system which controls a transmission rate of uplink user data to be transmitted from a mobile station to a radio base station, wherein the mobile station is configured to start to transmit the uplink user data, at an initial transmission rate which is informed from a network or an initial transmission rate which has been already informed from the network; and to increase the transmission rate of the uplink user data, up to a predetermined transmission rate, on a basis of a increase rule of the transmission rate which is beforehand determined.

A fifth aspect of the present invention is summarized as a mobile communications system which controls a transmission power of uplink user data to be transmitted from a mobile station to a radio base station, wherein the mobile station is configured to start to transmit the uplink user data, at an initial transmission power which is informed from a network or an initial transmission power which has been already informed from the network; and to increase the transmission power of the uplink user data, up to a predetermined transmission power, on a basis of a increase rule of the transmission power which is beforehand determined.

A sixth aspect of the present invention is summarized as a mobile communications system which controls a transmission power ratio of uplink user data to be transmitted from a mobile station to a radio base station, wherein the transmission power ratio of the uplink user data is a ratio of a transmission power of an enhanced dedicated physical data channel of the uplink user data to a transmission power of a dedicated physical data channel of the uplink user data; and the mobile station is configured to start to transmit the uplink user data, at an initial transmission power ratio which is informed from a network or an initial transmission power ratio which has been already informed from the network; and to increase the transmission power ratio of the uplink user data, up to a predetermined transmission power ratio, on a basis of a increase rule of the transmission power ratio which is beforehand determined.

A seventh aspect of the present invention is summarized as a mobile station which transmits uplink user data to a radio base station at a predetermined transmission rate; wherein the mobile station is configured to start to transmit the uplink user data, at an initial transmission rate which is informed from a network or an initial transmission rate which has been already informed from the network; and to increase the transmission rate of the uplink user data, up to a predetermined transmission rate, on a basis of a increase rule of the transmission rate which is beforehand determined.

An eighth aspect of the present invention is summarized as a mobile station which transmits uplink user data to a radio base station at a predetermined transmission power; wherein the mobile station is configured to start to transmit the uplink user data at an initial transmission power which is informed from a network or an initial transmission power which has been already informed from the network; and to increase the transmission power of the uplink user data, up to a predetermined transmission power, on a basis of a increase rule of the transmission power which is beforehand determined.

A ninth aspect of the present invention is summarized as a mobile station which transmits uplink user data to a radio base station at a predetermined transmission power ratio; wherein the transmission power ratio of the uplink user data is a ratio of a transmission power of an enhanced dedicated physical data channel of the uplink user data to a transmission power of a dedicated physical data channel of the uplink user data; and the mobile station is configured to start to transmit the uplink user data, at an initial transmission power ratio which is informed from a network or an initial transmission power ratio which has been already informed from the network; and to increase the transmission power ratio of the uplink user data, up to a predetermined transmission power ratio, on a basis of a increase rule of the transmission power ratio which is beforehand determined.

A tenth aspect of the present invention is summarized as a radio base station which receives uplink user data transmitted from a mobile station, wherein the radio base station is configured to assign uplink radio resources in order that the radio base station can receive the uplink user data, at an initial transmission power which is informed from a network or an initial transmission power which has been already informed from the network; and increase the uplink radio resources to be assigned, each time the transmission rate of the uplink user data is increased on a basis of a increase rule of increasing the transmission rate which is beforehand determined.

An eleventh aspect of the present invention is summarized as a radio base station which receives uplink user data transmitted from a mobile station, wherein the radio base station is configured to assign uplink radio resources in order that the radio base station can receive the uplink user data, at an initial transmission power which is informed from a network or an initial transmission power which has been already informed from the network; and increase the uplink radio resources to be assigned, each time the transmission power of the uplink user data is increased on a basis of a increase rule of increasing the transmission power which is beforehand determined.

A twelfth aspect of the present invention is summarized as a radio base station which receives uplink user data transmitted from a mobile station, wherein the radio base station is configured to assign uplink radio resources in order that the radio base station can receive the uplink user data, at an initial transmission power ratio which is informed from a network or an initial transmission power ratio which has been already informed from the network; and increase the uplink radio resources to be assigned, each time the transmission power ratio of the uplink user data is increased on a basis of a increase rule of increasing the transmission power ratio which is beforehand determined.

BRIEF DESCRIPTION OF THE DRAWINGS

FIG. 14 is a diagram showing an example of a table controlled by an E-TFC selector unit in the MAC-e function unit in the baseband signal processor unit in the mobile station according to the first embodiment of the present invention.

FIGS. 34(a) to 34(c) are diagrams respectively showing examples of tables controlled by a scheduler unit in a MAC-e function unit in a baseband signal processor unit in a radio base station according to a fourth embodiment of the present invention.

FIG. 35(a) to 35(c) are other diagrams respectively showing examples of tables controlled by the scheduler unit in the MAC-e function unit in the baseband signal processor unit in the radio base station according to the fourth embodiment of the present invention.

BEST MODE FOR CARRYING OUT THE INVENTION

A Configuration of a Mobile Communications System According to a First Embodiment of the Present Invention Descriptions will be provided for a configuration of a mobile communications system according to a first embodiment present invention by referring to FIGS. 6 to 25. The mobile communications system according to this embodiment is designed for the purpose of improving communication performance such as channel capacity and communication quality. In addition the mobile communications system according to this embodiment can be applied to the "W-CDMA" and the "CDMA2000" which are the third generation mobile communications systems.

Figure 6:
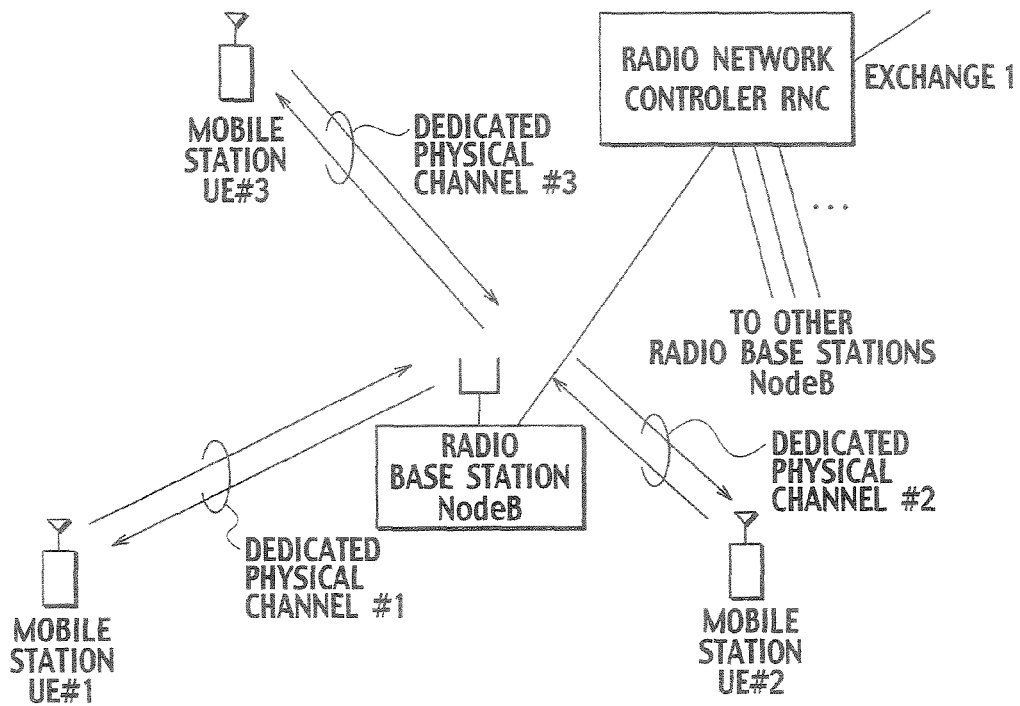
FIG. 6 is a diagram of an overall configuration of a mobile communications system according to a first embodiment of the present invention.

As shown in FIG. 6, the mobile communications system according to this embodiment is configured of an exchange 1, a radio network controller RNC, a radio base station NodeB and mobile stations UE. The mobile stations UE#1 to UE#3 shown in FIG. 6 transmit and receive user data to be transmitted by use of their respective dedicated physical channels #1 to #3 which have been set up for the mobile stations UE#1 to UE#3.

Figure 7:
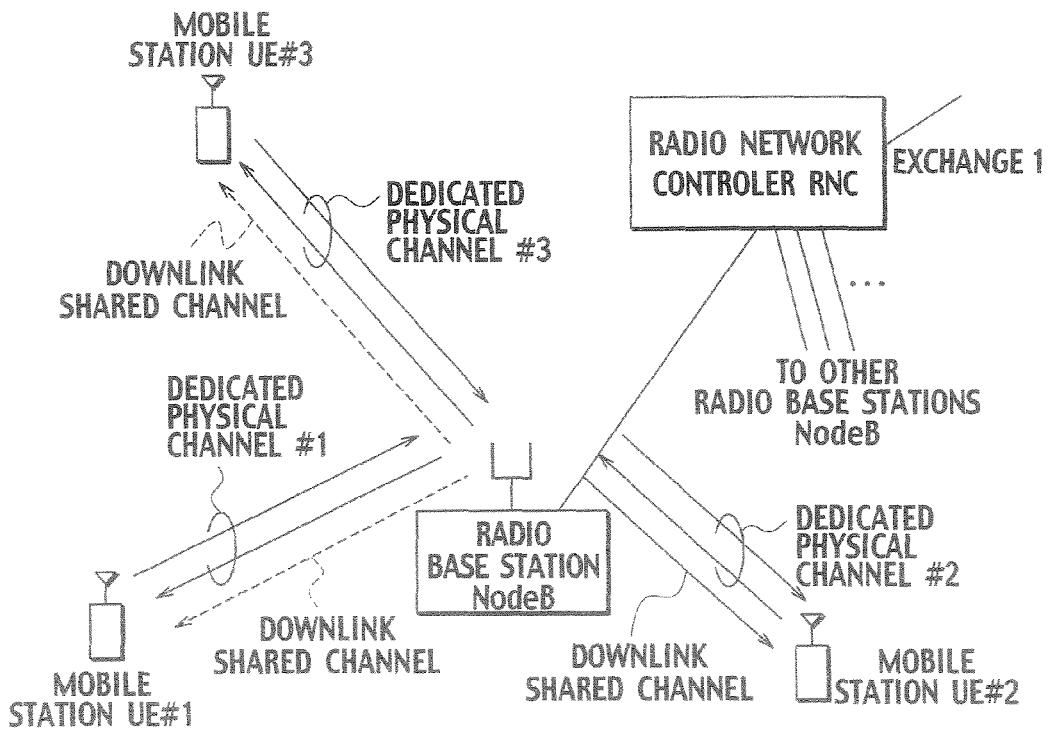
FIG. 7 is a diagram of another overall configuration of the mobile communications system according to the first embodiment of the present invention.

Furthermore, in this embodiment, the mobile stations UE#1 to UE#3 may be configured to use a high-speed downlink shared channel (for example, HS-DSCH in the 3GPP), as shown in FIG. 7.

In this case, downlink user data is transmitted chiefly by use of the downlink shared channel. On the other hand, the dedicated physical channel is a two-way channel dedicated to each mobile station which performs communications by use of the downlink shared channel. An uplink dedicated physical channel transmits a pilot symbol, a transmission power control command for a downlink dedicated physical channel, downlink quality information used for scheduling the shared channel or for an adaptive modulation and coding, and the like in addition to user data. A downlink dedicated physical channel transmits a transmission power control command for the uplink dedicated physical channel, and the like.

In FIG. 7, it is assumed that a downlink shared channel is dedicated to the mobile station UE#2 at the time.

Note that, although the present invention is intended to be applied to the mobile communications system as shown in FIGS. 6 and 7, the present invention can be also applied to another mobile communications system as long as the uplink user data are transmitted.

Figure 8:
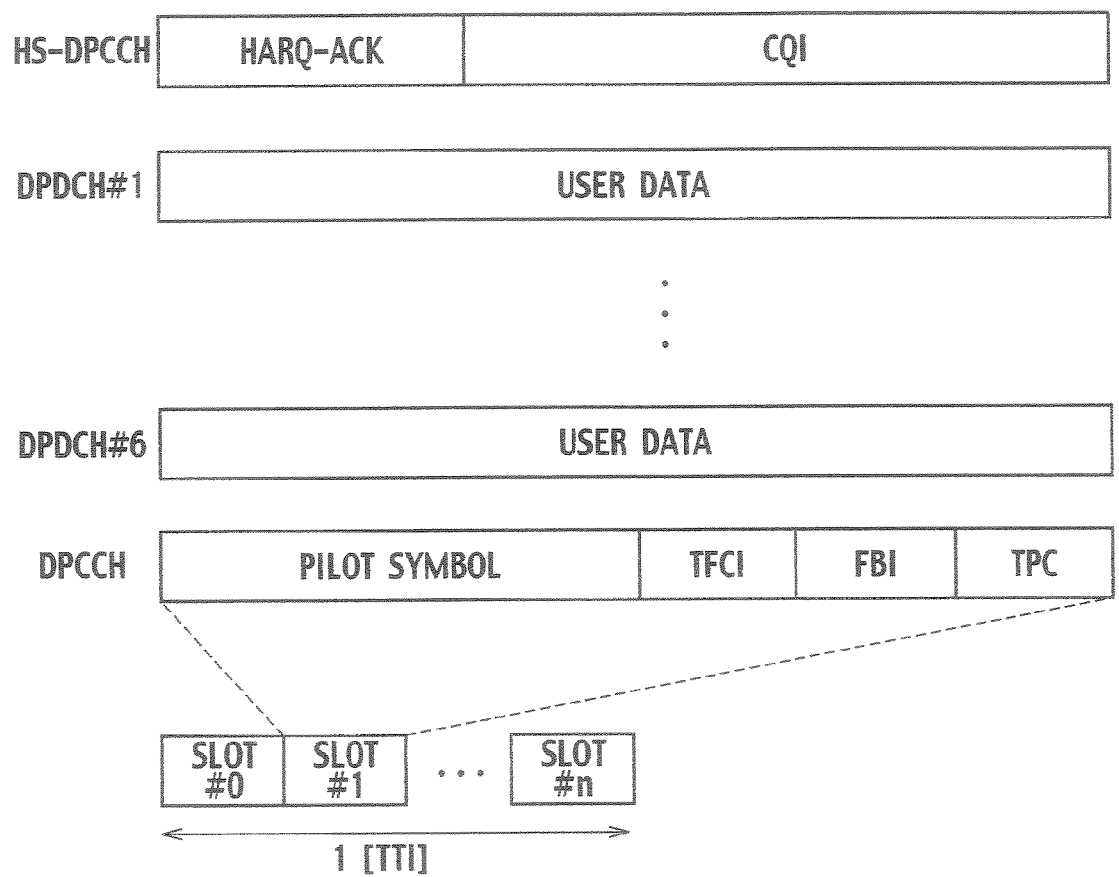
FIG. 8 is a diagram illustrating a frame format of a dedicated physical channel used for the mobile communications system according to the first embodiment of the present invention.

FIG. 8 shows a frame format of an uplink dedicated physical channel in the mobile communications system according to this embodiment.

Figure 1:
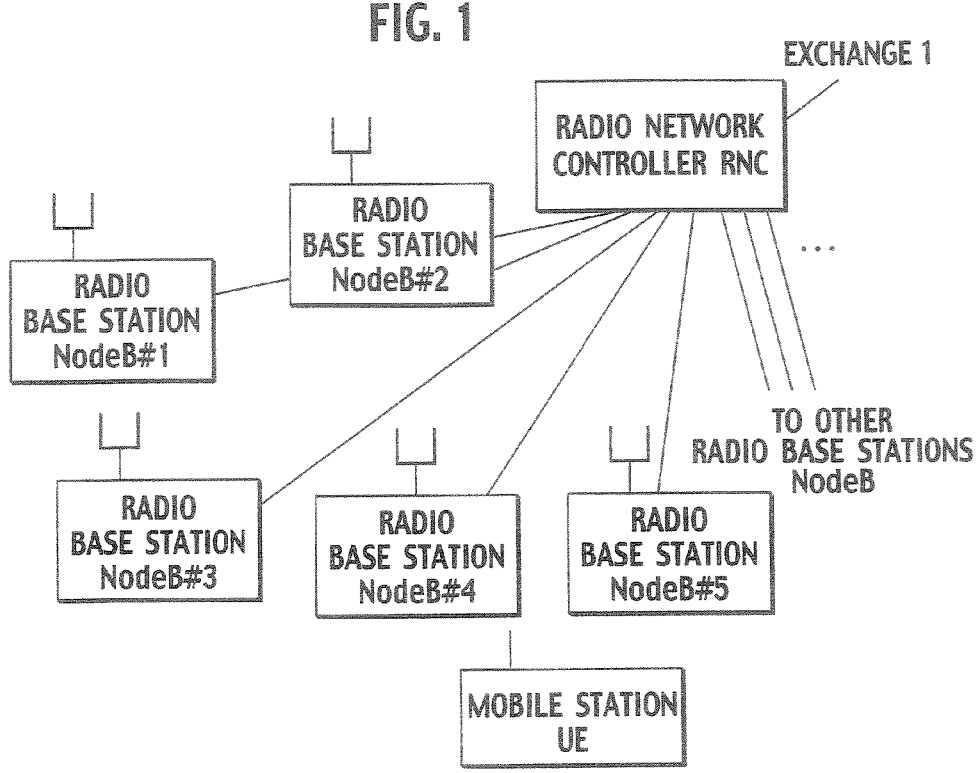
FIG. 1 is a diagram showing an overall configuration of a general mobile communications system.
Figure 2:
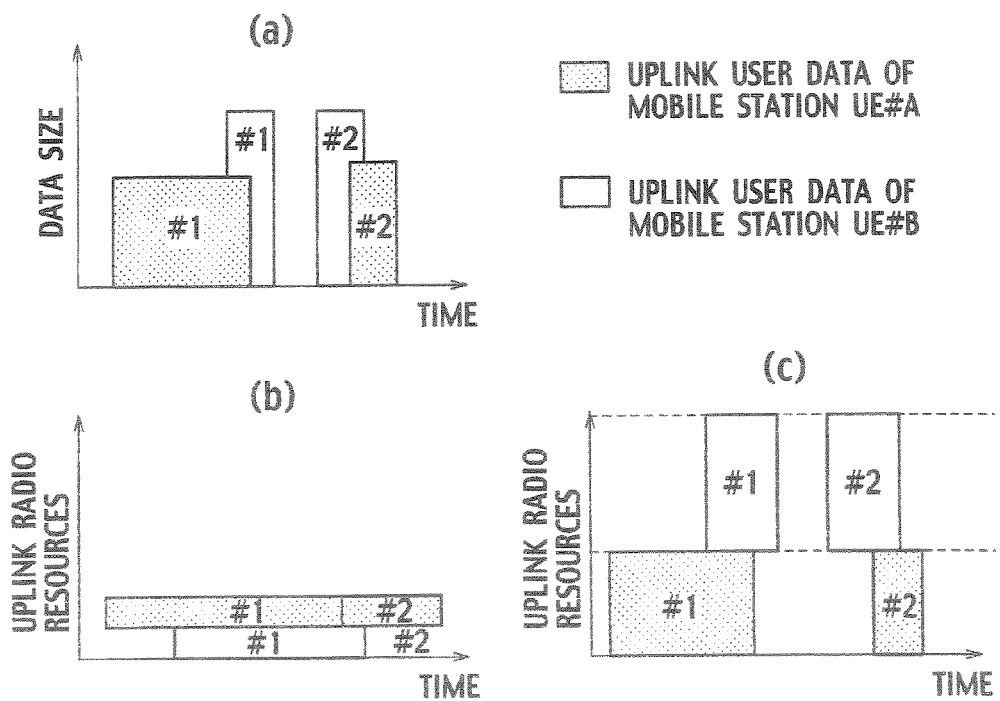
FIG. 2(a) is a diagram showing user data which takes place in a burst manner in a mobile communications system based on the prior art.
FIGS. 2(b) and 2(c) are diagrams each illustrating a method of controlling a transmission rate of uplink user data in the mobile communications system based on the prior art.
Figure 3:
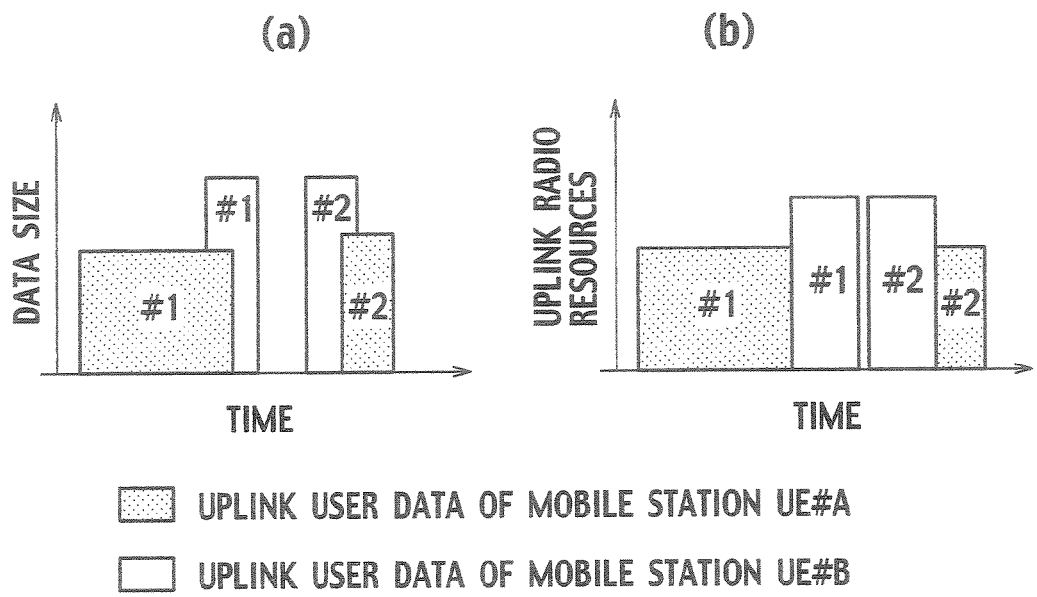
FIG. 3(a) is a diagram showing user data which occurs in a burst manner in a mobile communications system using the conventional "Time & Rate Control
" FIG. 3(b) is a diagram illustrating a method of controlling a transmission rate of uplink user data in the mobile communications system using the conventional "Time & Rate Control".
Figure 4:
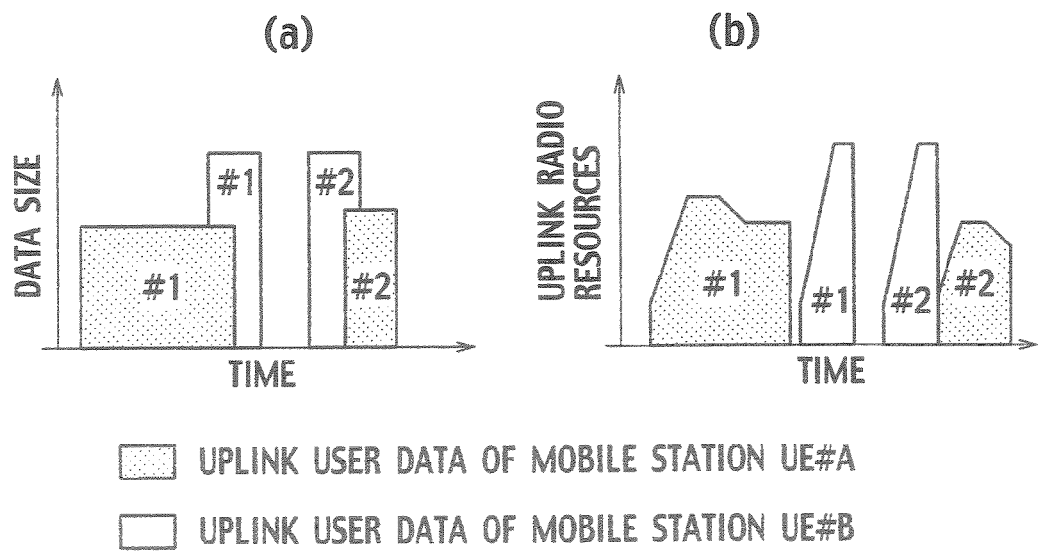
FIG. 4(a) is a diagram showing user data which occurs in a burst manner in a mobile communications system using the conventional "Rate Control".
FIG. 4(b) is a diagram illustrating a method of controlling a transmission rate of uplink user data in the mobile communications system using the conventional "Rate Control"
Figure 5:
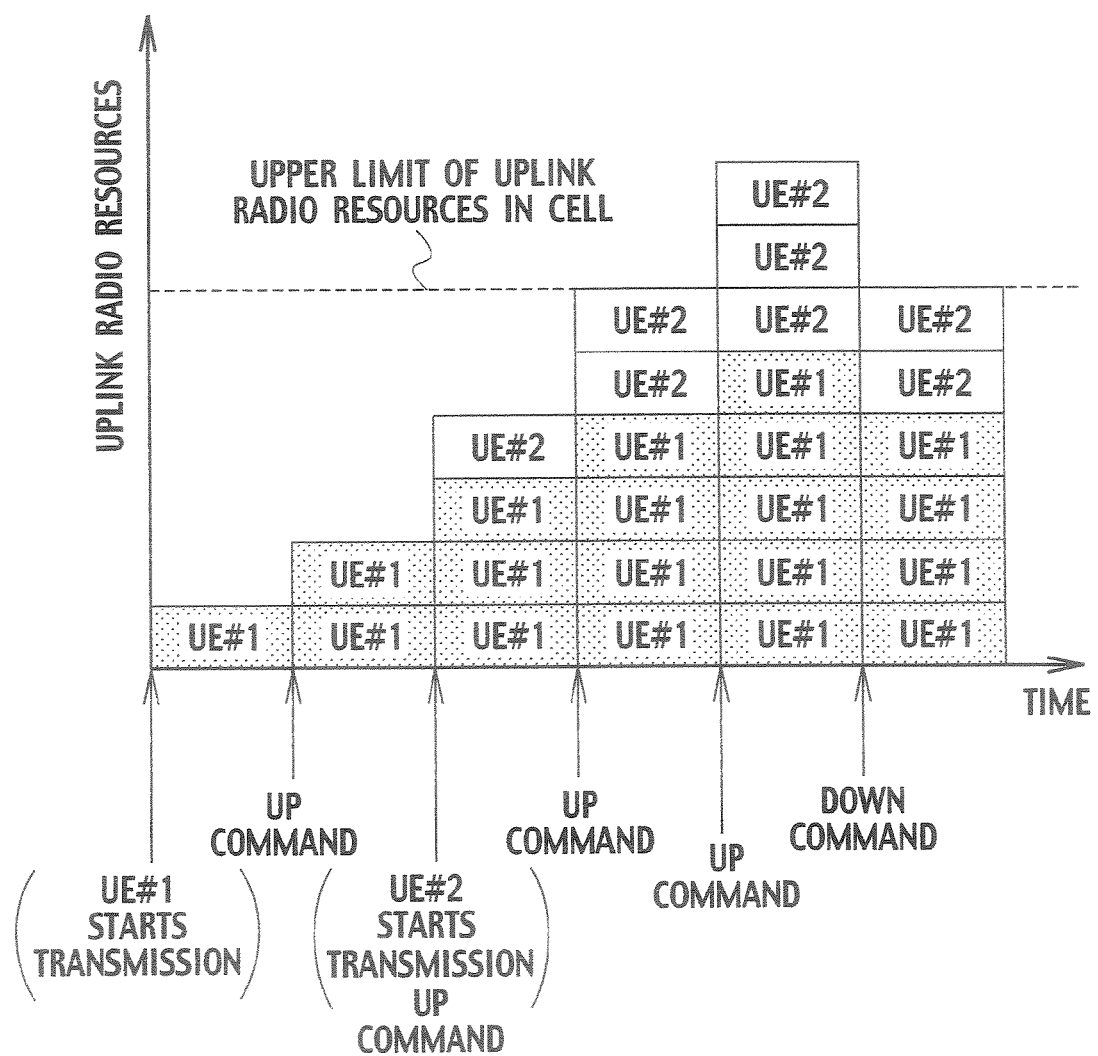
FIG. 5 is a diagram illustrating problems with the mobile communications system using the conventional "Rate Control".

As shown in FIG. 3, the dedicated physical channel is configured to be transmitted by a predetermined TTI unit or by a TTI unit which is set up by Layer 3.

A dedicated physical channel within a time unit termed as a "slot" is configured to include a dedicated physical data channel (DPDCH), a dedicated physical control channel (DPCCH) and a dedicated physical control channel (HS-DPCCH) for HSDPA.

It should be noted that a dedicated physical data channel for the foregoing Enhanced Uplink (Enhanced Dedicated Physical Data Channel) is abbreviated to "E-DPDCH". In addition, a dedicated physical control channel for the forgoing Enhanced Uplink (Enhanced Dedicated Physical Control Channel) is abbreviated to "E-DPCCH".

Specifically, a DPDCH, DPCCH and HS-DPCCH are modulated by BPSK (Binary Phase-Shift Keying), and thus are sorted with their respective spread codes and phases. Thereafter, the DPDCH, DPCCH and HS-DPCCH are multiplexed and transmitted in the above-described manner. Noted that, in a case where the spread ratio (spread coefficient) of takes on a minimum value (for example, four), and where the number of bits which are needed to transmit user data is not enough, one up to five DPDCHs can be added.

The spread ratio and the number of spread multi-codes of DPDCH are dynamically changed by transport block size. Specifically, in a case where the transport block size is larger, the spread ratio of DPDCH is set smaller. In a case where the number of bits which are needed to transmit user data is not enough, multi-coding is performed.

It should be noted that the number of slots for each TTI is usually set in a way that the number of slots is optimal for the mobile communications system and the applications.

Figure 9:
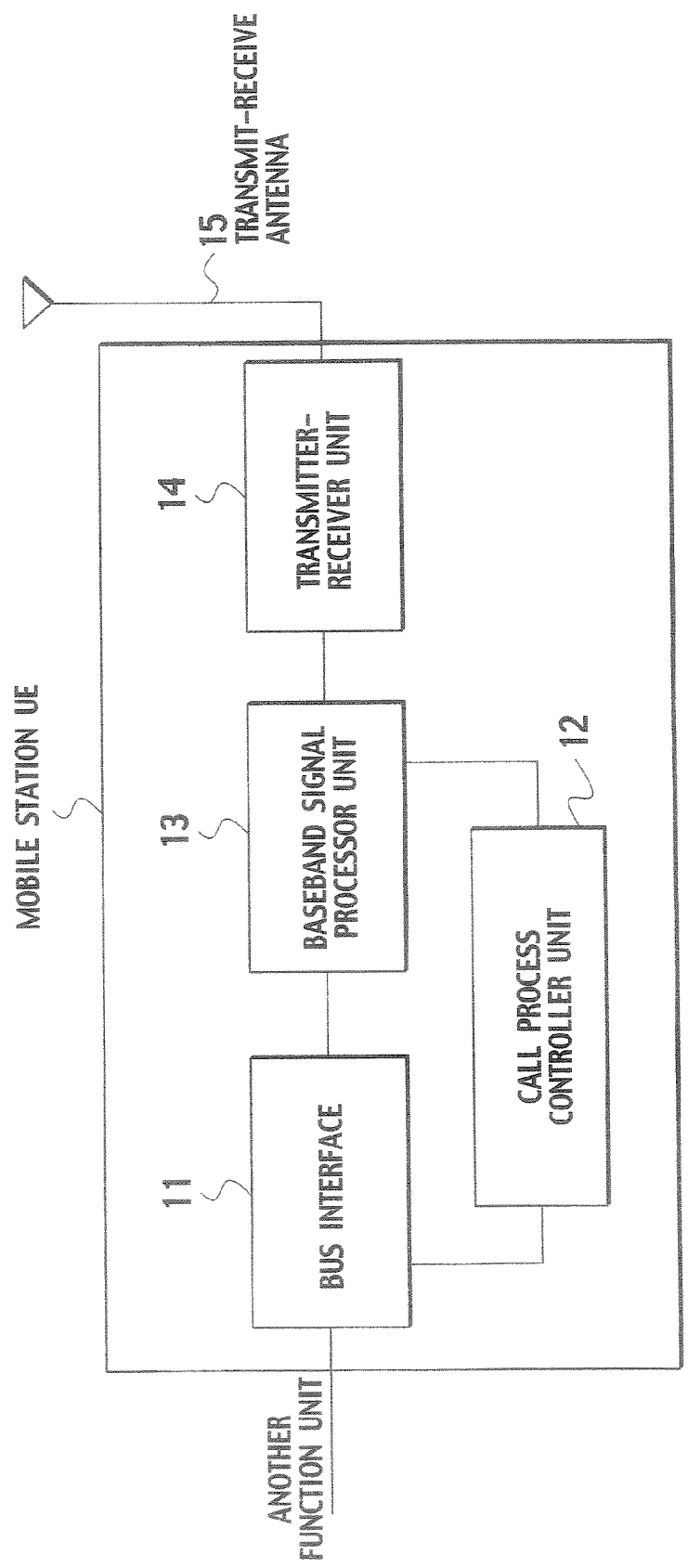
FIG. 9 is a functional block diagram of a mobile station according to the first embodiment of the present invention.

FIG. 9 shows an example of a schematic configuration of a mobile station UE according to this embodiment. As shown in FIG. 9, the mobile station UE includes a bus interface unit 11, a call process controller unit 12, a baseband signal processor unit 13, a transmitter-receiver unit 14 and a transmit-receive antenna 15. In addition, the mobile station UE may be configured to include an amplifier unit (not illustrated).

It should be noted that these components do not have to be mutually independent entities as hardware. In other words, these components may be combined together, or may be configured by software processes.

Figure 10:
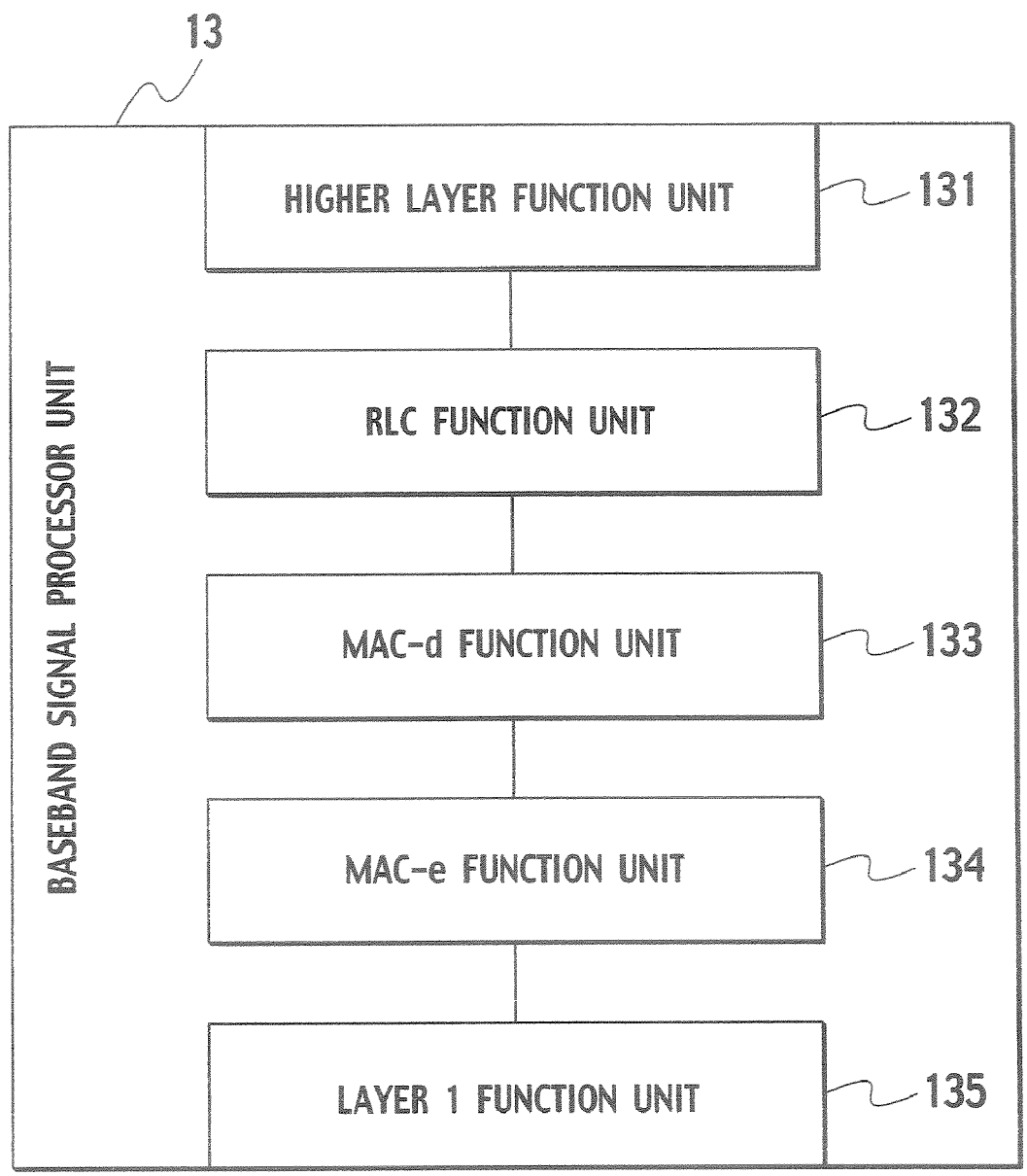
FIG. 10 is a functional block diagram of a baseband signal processor unit in the mobile station according to the first embodiment of the present invention.

FIG. 10 shows a functional block of the baseband signal processor unit 13. As shown in FIG. 10, the baseband signal processor unit 13 includes a higher layer function unit 131, an RLC function unit 132 which functions as an RLC (Radio Link Control) sublayer, a MAC-d function unit 133, a MAC-e function unit 134 and a Layer 1 function unit 135 which functions as Layer 1.

Figure 11:
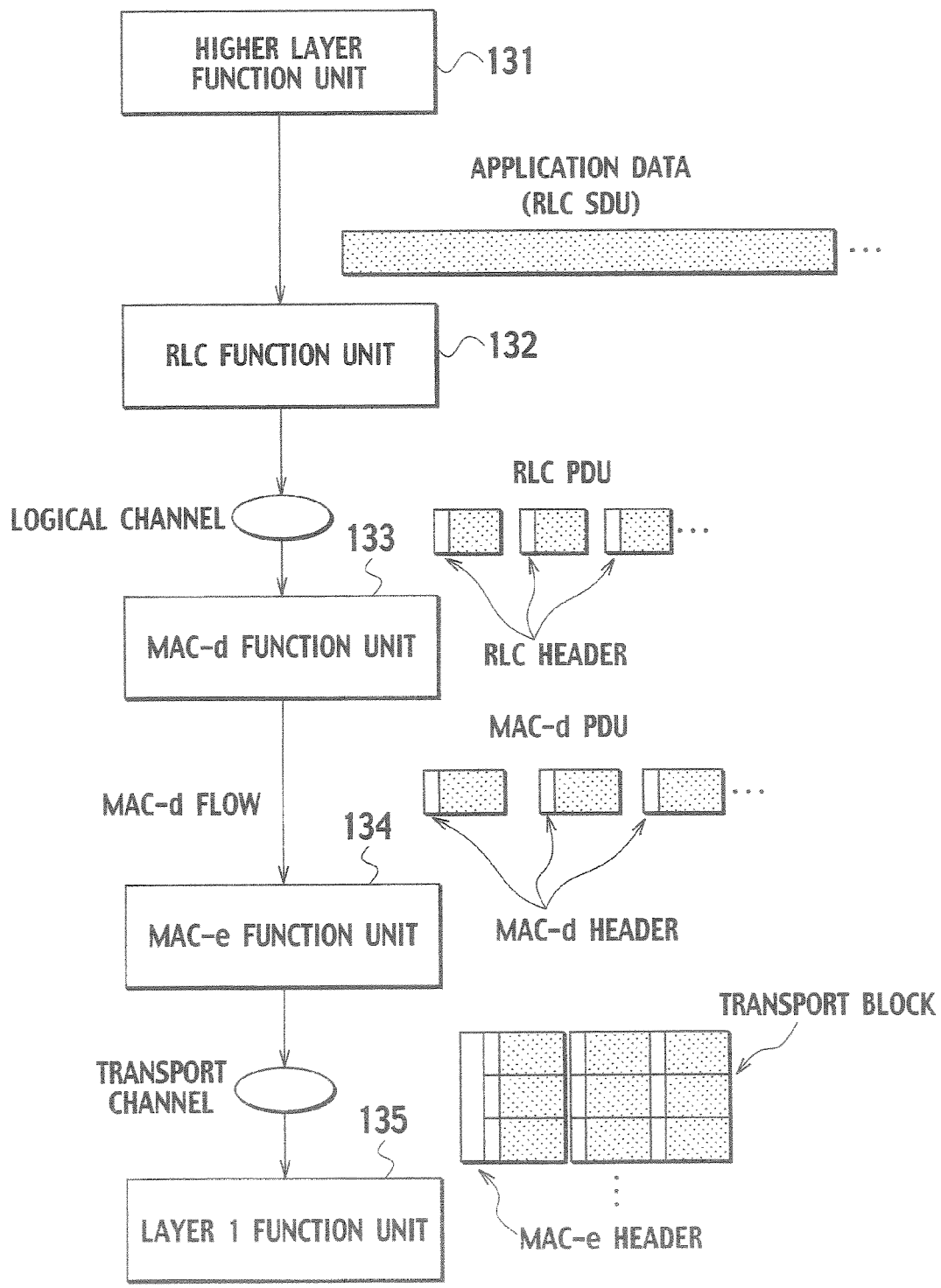
FIG. 11 is a diagram illustrating a function of the baseband signal processor unit in the mobile station according to the first embodiment of the present invention.

As shown in FIG. 11, the RLC function unit 132 divides application data (RLC SDU), which has been received from the higher layer function unit 131, into PDUs of a predetermined size, and adds RLC headers to the PDUs, the RLC headers being used for a sequential process, a retransmission process and the like. Thereby, the RLC function unit 132 generates RLC PDUs, and transfers the RLC PDUs to the MAC-d function unit 133.

In this respect, a pipe to function as a bridge between the RLC function unit 132 and the MAC-d function unit 133 is a "logical channel". The logical channel is categorized depending on contents of data to be transmitted or received. In the case of performing communications, one connection car have a plurality of logical channels. In other words, data having different contents (for example, control data, user data and the like) can be logically transmitted or received in parallel.

The MAC-d function unit 133 is configured to multiplex the logical channel and to add a MAC-d header, which is associated with such multiplexing, to the multiplexed logical channel, thereby generating MAC-d PDU. It is assumed that a plurality of MAC-d PDUs are transferred from the MAC-d function unit 133 to the MAC-e function unit 134 as a MAC-d flow.

In addition, the MAC-d function unit 133 is configured to perform a priority control process, a transmission power measurement process, a process of controlling the transmission rate of uplink user data in order for the transmission power of the uplink user data not to exceed the maximum allowable transmission power of the mobile station, and the like.

The MAC-e function unit 134 is configured to add a MAC-e header to a group of the plurality of MAC-d PDUs which have been received as the MAC-d flow from the MAC-d function unit 133, and to generate transport blocks.

Subsequently, the MAC-e function unit 134 is configured to transfer the generated transport blocks to the Layer 1 function unit 135 through a transport channel.

Furthermore, the MAC-e function unit 134 is configured to function as a lower layer than the MAC-d function unit 133 and to perform a retransmission control function and a transmission rate control function by the Hybrid ARQ (HARQ).

Figure 12:
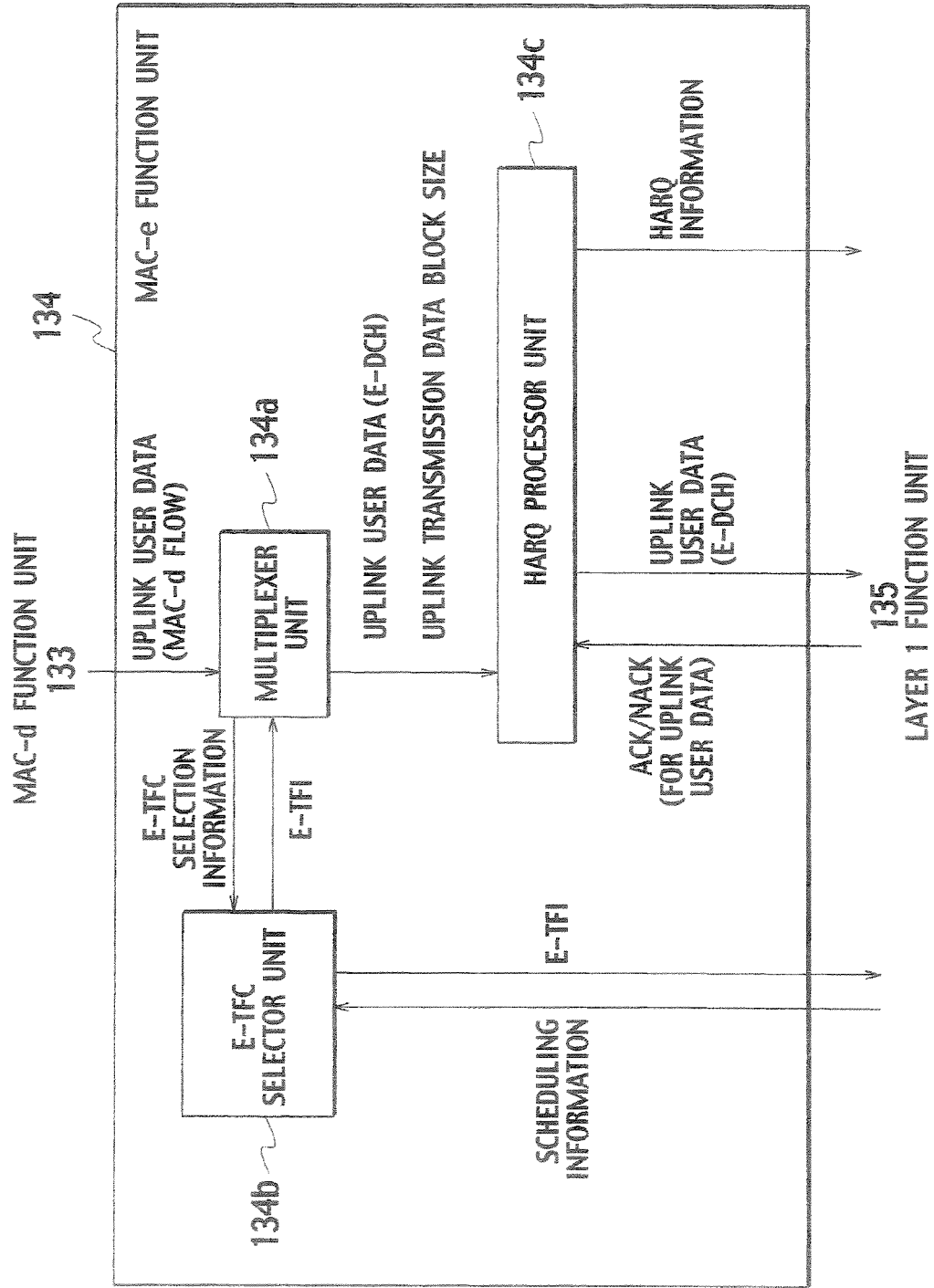
FIG. 12 is a functional block diagram of a MAC-e function unit in the baseband signal processor unit in the mobile station according to the first embodiment of the present invention.

Specifically, as shown in FIG. 12, the MAC-e function unit 134 includes a multiplexer unit 134a, an E-TFC selector unit 134b, and a HARQ processor unit 134c.

The multiplexer unit 134a is configured to perform a multiplex process on uplink user data which has been received as a MAC-d flow from the MAC-d function unit 133, based on E-TFI (Enhanced Transport Format Indicator) notified by the E-TFC selector unit 134b, to generate uplink user data (transport blocks) to be transmitted through the transport channel (E-DCH), and to transmit the generated uplink user data to the HARQ processor unit 134.

Hereinafter the uplink user data received as the MAC-d flow will be denoted by "uplink user data (MAC-d flow)", and the uplink user data to be transmitted through the transport channel (E-DCH) will be denoted by "uplink user data (E-DCH)".

In this respect the E-TFI is an identifier of a transport format which is a format for supplying transport blocks for each TTI in the transport channel (E-DCH), and is added to the forgoing MAC-e header.

In addition, the multiplexer unit 134a is configured to determine the uplink transmission data block size to be applied to the u link user data, on the basis of the E-TFI notified by the E-TFC selector unit 134b, and to inform the HARQ processor unit 134 of the determined uplink transmission data block size.

It should be noted that in a case where the multiplexer unit 134a receives the uplink user data as the MAC-d flow from the MAC-d function unit 133, the multiplexer 134a is configured to inform the E-TFC selector unit 134b of E-TFC selection information for selecting the transport format for the uplink user data.

In this respect, the data size, the priority class and the like of the uplink user data are included in the E-TFC selection information.

Figure 13:
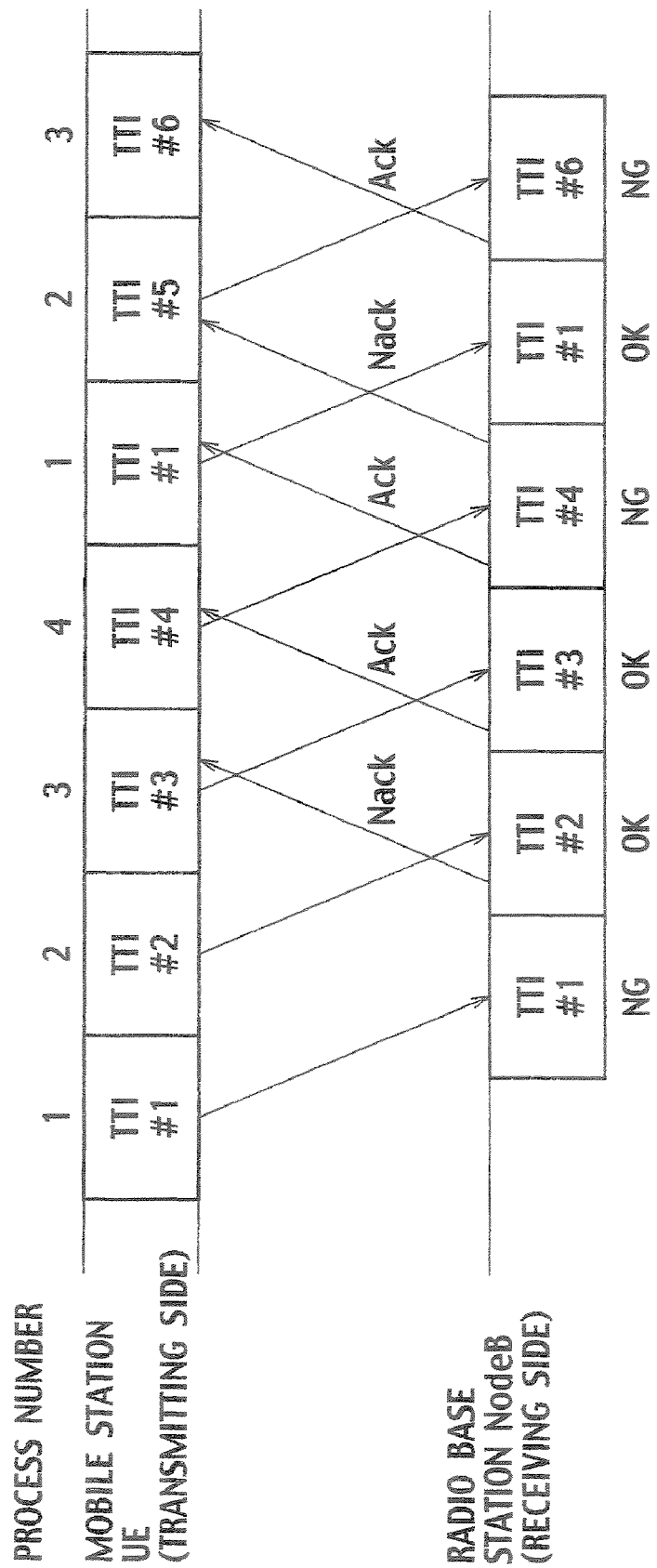
FIG. 13 is a diagram showing an example of an operation of a 4-channel stop-and-wait protocol performed by a HARQ processor of the MAC-e function unit in the baseband signal processor unit in the mobile station according to the first embodiment of the present invention.

The HARQ processor unit 134c is configured to perform a retransmission control process on the uplink user data (E-DCH) by use of N-channel Stop-and-Wait (N-SAW) protocol, on the basis of Ack/Nack for the uplink user data which has been notified by the Layer 1 function unit 135. In this point, FIG. 13 shows an example of an operation of a 4-channel stop-and-wait protocol.

In addition the HARQ processor unit 134c is configured to transmit the uplink user data (E-DCH), which has been received from the multiplexer unit 134a, and HARQ information (for example, a retransmission number), which is used for a HARQ process, to the Layer 1 function unit 135.

The F-TFC selector unit 134b is configured to select a transport format (E-TF) to be applied to the uplink user data (E-DCH), so as to determine the transmission rate (transmission data block size) of the uplink user data.

Specifically, the F-TFC selector unit 134b is configured to determine whether transmission of the uplink user data is to be performed or stopped, on the basis of scheduling information which has been received from the radio base station NodeB (for example, a base station maximum allowable transmission rate), the data amount of MAC-d PDUs which has been transferred from the MAC-d function unit 133 (the data size of the uplink user data), conditions of hardware resources of the radio base station NodeB which is controlled by the MAC-e function unit 134. Subsequently, the E-TFC selector unit 134b is configured to select the transport format (E-TF) to be applied to the transmission of the uplink user data, and to informs the Layer 1 function unit 135 and the multiplexer unit 134a of the E-TFI for identifying the transport format.

As shown in FIG. 14, for example, the E-TFC selector unit 134b is configured to manage an "increase rule of a transmission rate of uplink user data" to associate a "rate level", a "current transmission rate (kbps)" and a "next-time maximum allowable transmission rate (kbps)."

Specifically, according to the increase rule shown in FIG. 14, a maximum allowable transmission rate of uplink user data which can be transmitted at the next timing (TTI) (next-time maximum allowable transmission rate) is assigned to the mobile station UE belonging to each of the rate levels.

It should be noted that such an increase rule may be common among all the cells. Otherwise, the increase rule may be different from one cell to another, from one mobile station UE to another, or from one piece of uplink user data to another.

In addition, such an increase rule may be generated by the radio network controller RNC at a predetermined timing. Otherwise, the increase rule may be a fixed one throughout the mobile communications system.

The E-TFC selector unit 134b is configured to extract the "next-time maximum allowable transmission rate" associated with the current transmission rate of uplink user data which is being transmitted by the mobile station UE, by referring to the foregoing increase rule, and to set the extracted "next-time maximum allowable transmission rate" as the transmission rate of the uplink user data which can be transmitted at the next TTI.

As a consequence, according to the increase rule shown in FIG. 14, the transmission rate of the uplink user data is increased, until uplink user data to be transmitted, which has been accumulated in the mobile station UE, is all transmitted out.

In addition, the E-TFC selector unit 134b is configured to start to transmit the uplink user data at an initial transmission rate which is to be notified by the network, or at an initial transmission rate which has already been notified by the network. Subsequently, the E-TFC selector unit 134b is configured to increase the transmission rate of the uplink user data, up to a predetermined transmission rate (for example, the base station maximum transmission rate), on the basis of a predetermined increase rule (refer to FIG. 14).

Figure 15:
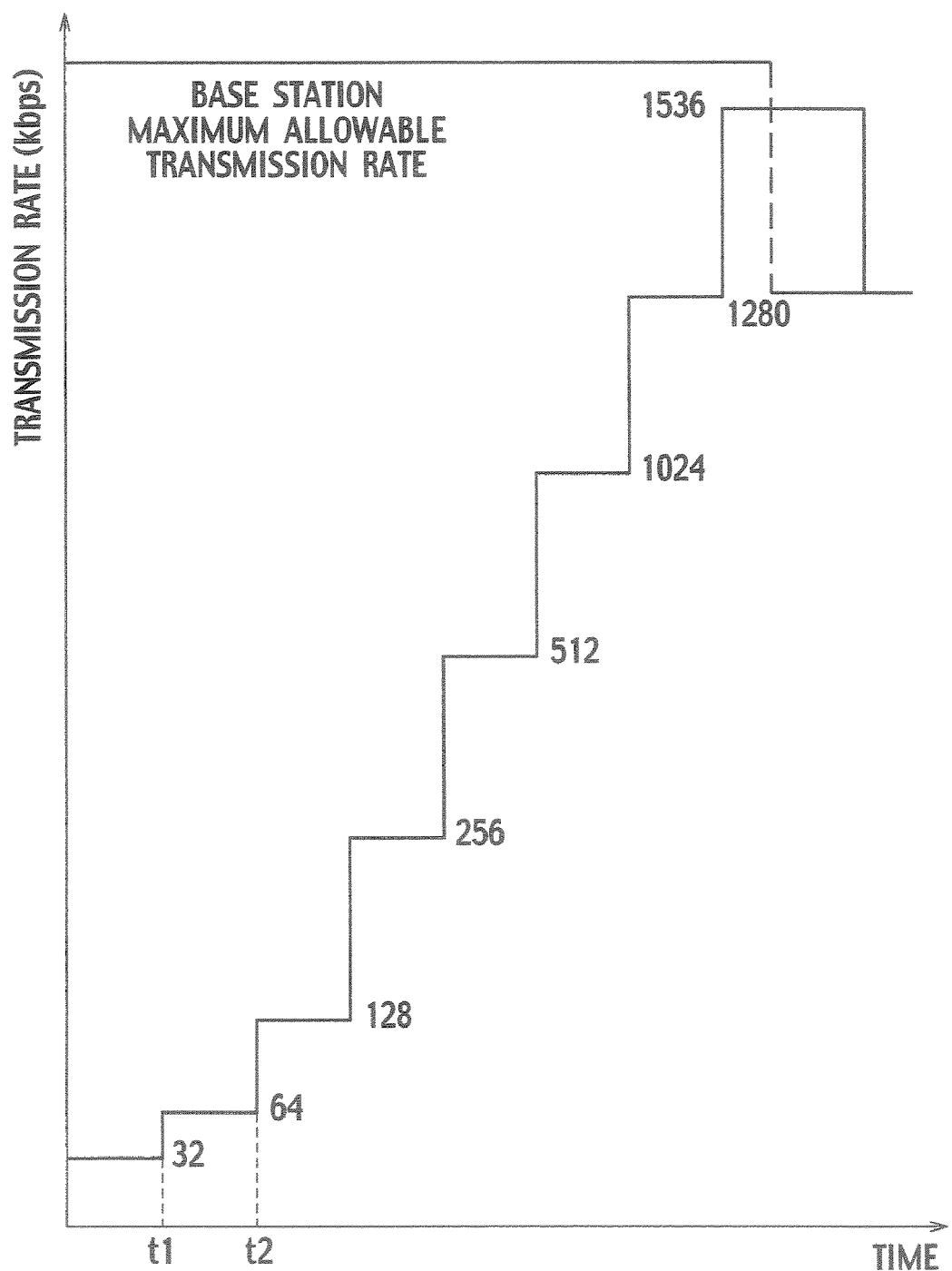
FIG. 15 is a diagram showing how a transmission rate of uplink user data is controlled by the mobile station according to the first embodiment of the present invention.

FIG. 15 shows how the transmission rate of the uplink user data is changed, in a case where, supposedly, sufficient uplink user data to be transmitted has been accumulated in a mobile station UE, and the MAC-d function unit 133 does not impose a restriction on the transmission rate of the uplink user data.

In the example of FIG. 15, the transmission rate of the uplink user data starts to increase from "32 kbps", because the initial transmission rate of the uplink user data is set at "32 kbps". However, in an actual case, it is likely that the initial transmission rate may be variable depending on parameters of the mobile communications system and the type of the mobile station UE.

It should be noted that the transmission rate of the uplink user data may be changed at each TTIs. Otherwise, the transmission rate may be charmed at the same timing as a round of N-SAW in HARQ is completed, or at a TTI immediately after the mobile station UE receives a transmission acknowledge signal (ACK) for the uplink user data from the radio base station NodeB.

In this respect, the timing at which the round of N-SAW in HARQ is completed means a timing at which TTI#1 to TTI#4 are transmitted in the case shown in FIG. 13.

It is conceivable that the amount of uplink interference may be increased, because a mobile station UE which is transmitting uplink user data is configured to increase the transmission rate of the uplink user data gradually. On the other hand, it is also conceivable that the amount of uplink interference may decrease, because another mobile station UE completes transmitting uplink user data which has been retained in a buffer, and thus terminates the transmission of uplink user data.

The radio base station NodeB is configured to determine a maximum allowable transmission rate of the uplink user data (a base station maximum allowable transmission rate) at each predetermined timings (for example, per one or plurality of TTIs), depending on the increase and decrease of the amount of uplink interference, and to inform the determined maximum allowable transmission rate of the uplink user data by use of the downlink shared channel.

In other words, the radio base station NodeB may control the maximum allowable transmission rate in order that the radio capacity of the entire cell can be increased as much as possible while preventing a cell radius from decreasing by making the amount of the uplink interference as close to a maximum allowable amount of interference as possible. In this respect, the cell radius is defined as the distance of the mobile station UE from the radio base station NodeB which allows the ratio base station NodeB to receive the uplink user data.

Otherwise the radio base station NodeB may determine coefficients for calculating the maximum allowable transmission rate of the uplink user data, thus informing the determined coefficients, instead of determining and informing the maximum allowable transmission rate. In this case, the mobile station UE determines the maximum allowable transmission rate of the uplink user data in itself by use of the foregoing coefficients.

The maximum allowable transmission rate of the uplink user data is changed depending on conditions of the propagation paths respectively from the mobile stations UE and on fluctuation of the propagation paths. As a result, it is possible to obtain high throughputs.

The radio base station NodeB may be configured to inform the entire cell, which is controlled by the radio base station NodeB, of the foregoing base station maximum allowable transmission rate or the foregoing coefficients for calculating the base station maximum allowable transmission rate.

As shown in FIG. 15, the E-TFC selector unit 134b is configured to reduce the current transmission rate of the uplink user data down to the base station maximum allowable transmission rate, in a case where the current transmission rate exceeds the base station maximum allowable transmission rate.

Furthermore, the radio base station NodeB informs a maximum allowable transmission power and a maximum allowable transmission power ratio of the uplink user data (or coefficients for calculating the maximum allowable transmission power and the maximum allowable transmission power ratio), in a case where the radio base station NodeB controls the transmission power and the transmission power ratio of the uplink user data, instead of controlling the transmission rate of the uplink user data as described later. In this case, the E-TFC selector unit 134b is similarly configured to reduce the current transmission power and the current transmission power ratio of the uplink user data down to the maximum allowable transmission power and the maximum allowable transmission power ratio.

Moreover, in some cases, the transmission rate of the uplink user data may be restricted as a transmission rate lower than 1536 kbps which is shown in FIG. 15.

As well, due consideration is also given to a case where uplink user data to be transmitted, which has been retained in the mobile station UE, is all transmitted out so that the transmission of the u link user data is terminated. The following two rules are considered to be applied to the case where transmission of uplink user data is terminated.

A first rule is a rule that, after the transmission of uplink user data is terminated, in a case where new uplink user data to be transmitted takes place, the new uplink user data starts to be transmitted from a predetermined transmission rate (for example, an initial transmission rate).

A second rule is that even in a case where the transmission of uplink user data is terminated if new uplink user data to be transmitted takes place within a predetermined period of time (rate level holding time $T_h$), the transmission rate is reduced only to a rate level lower than the current rate level by one level (or not reduced at all). However, once the predetermined period of time runs out with nothing transmitted, the rest of the operation complies with the first rule.

Figure 16:
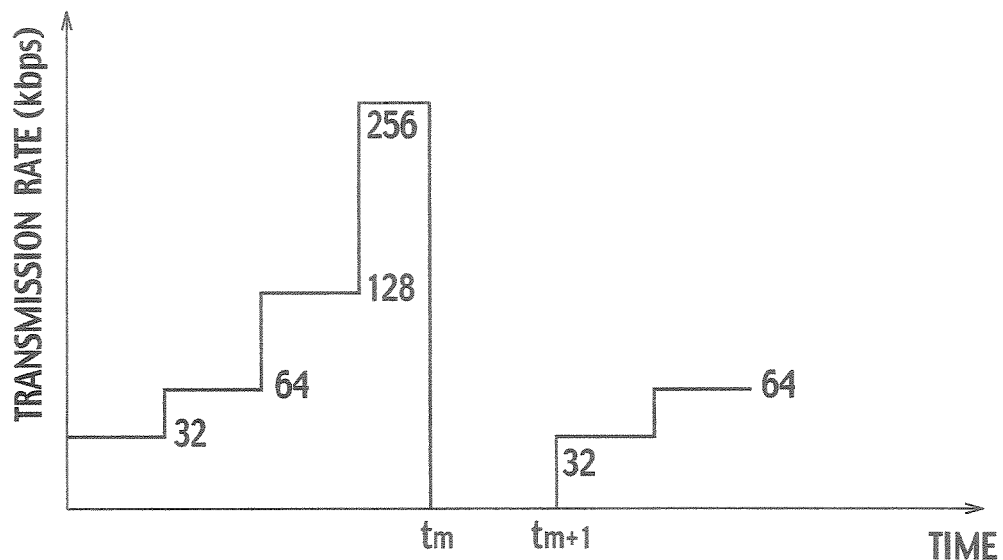
FIG. 16 is another diagram showing how the transmission rate of uplink user data is controlled by the mobile station according to the first embodiment of the present invention.
Figure 17:
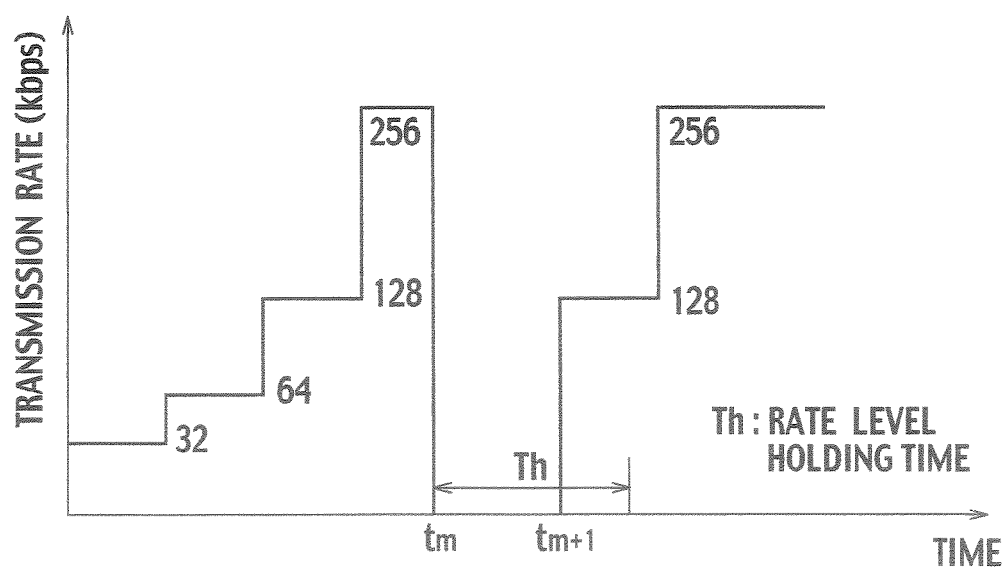
FIG. 17 is yet another diagram showing how the transmission rate of uplink user data is controlled by the mobile station according to the first embodiment of the present invention.

FIG. 16 shows how transmission rate of uplink user data is changed in a case where the first rule is applied. FIG. 17 shows how transmission rate of uplink user data is changed in a case where the second rule is applied.

Figure 18:
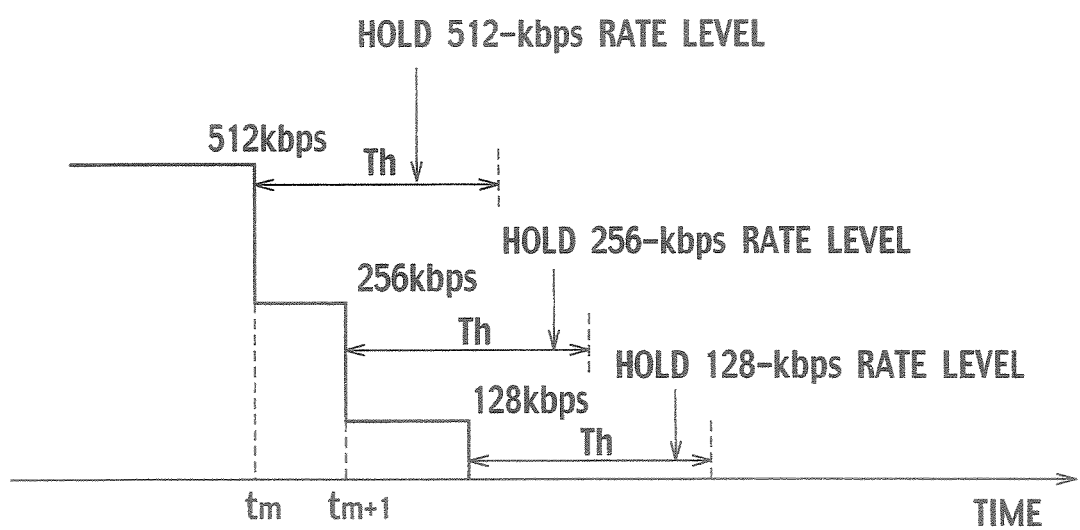
FIG. 18 is still another diagram showing how the transmission rate of uplink user data is controlled by the mobile station according to the first embodiment of the present invention.

In addition it is also conceivable that the first and second rules are expanded so that a timer for measuring whether or not the rate level holding time $T_h$ runs out is provided to each of the rate levels. In the other words, even in a case where transmission rate of uplink user data which is being transmitted from the mobile station UE drops at a moment, the transmission rate is reduced only to a rate level lower than the current rate level by one level (or not reduced at all) until time to be measured by the timer corresponding to such a transmission rate runs out. FIG. 18 shows how transmission rate of uplink user data is changed in this case.

In a case where, as shown in FIG. 18, transmission rate of uplink user data goes down gradually, the rate level at each timing is held for the rate level holding time $T_h$, the rate level holding timer measuring whether or not the rate level holding time $T_h$ runs out.

Figure 19:
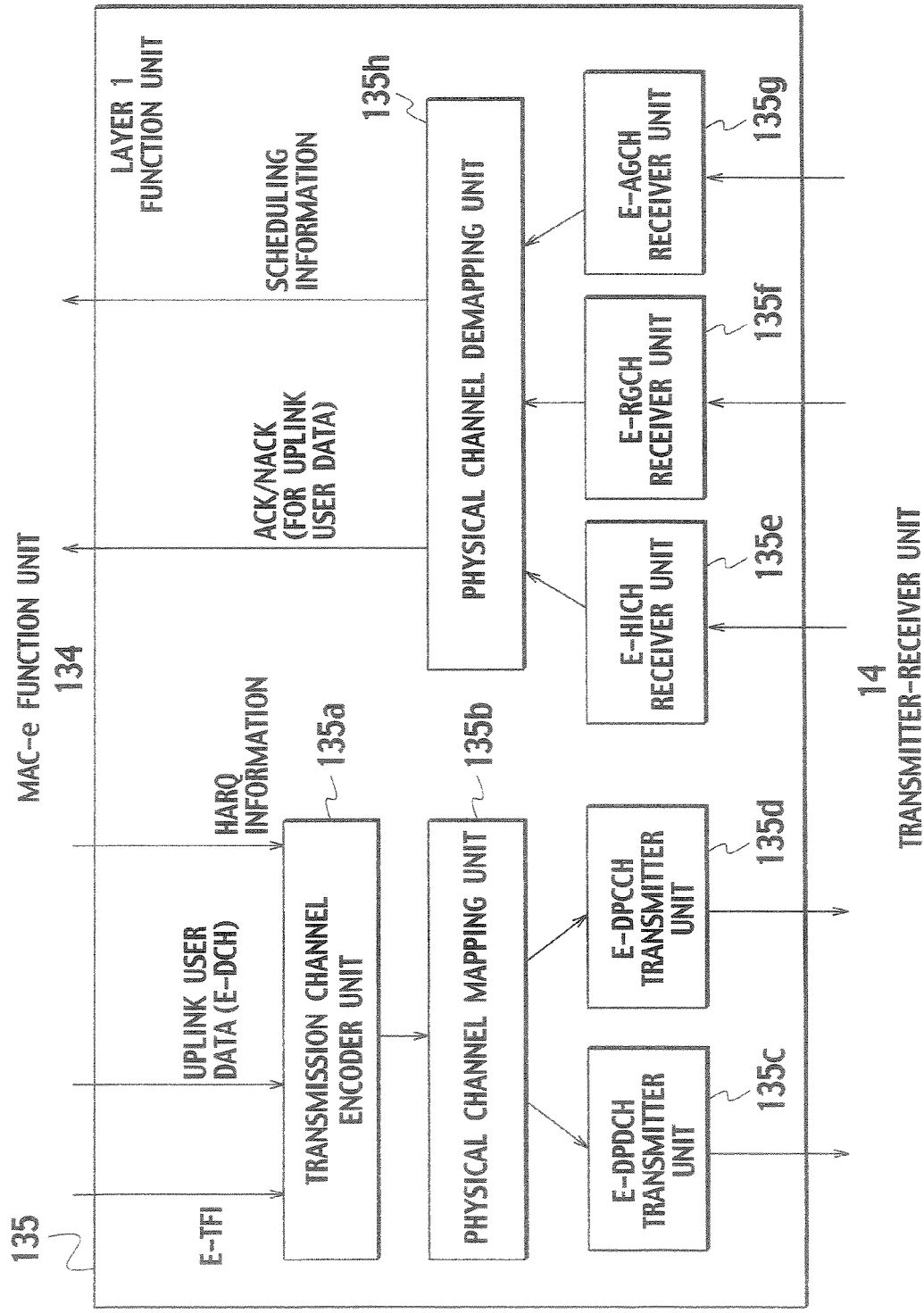
FIG. 19 is a functional block diagram of a Layer 1 function unit in the baseband signal processor unit in the mobile station according to the first embodiment of the present invention.

As shown in FIG. 19, the Layer 1 function unit 135 includes a transmission channel encoder unit 135a, a physical channel mapping unit 135b, an E-DPDCH transmitter unit 135c, an E-DPCCH transmitter unit 135d, an E-HIGH receiver unit 135e, an E-RGCH receiver unit 135f, an T-AGCH receiver unit 135g and a physical channel demapping unit 135h.

Figure 20:
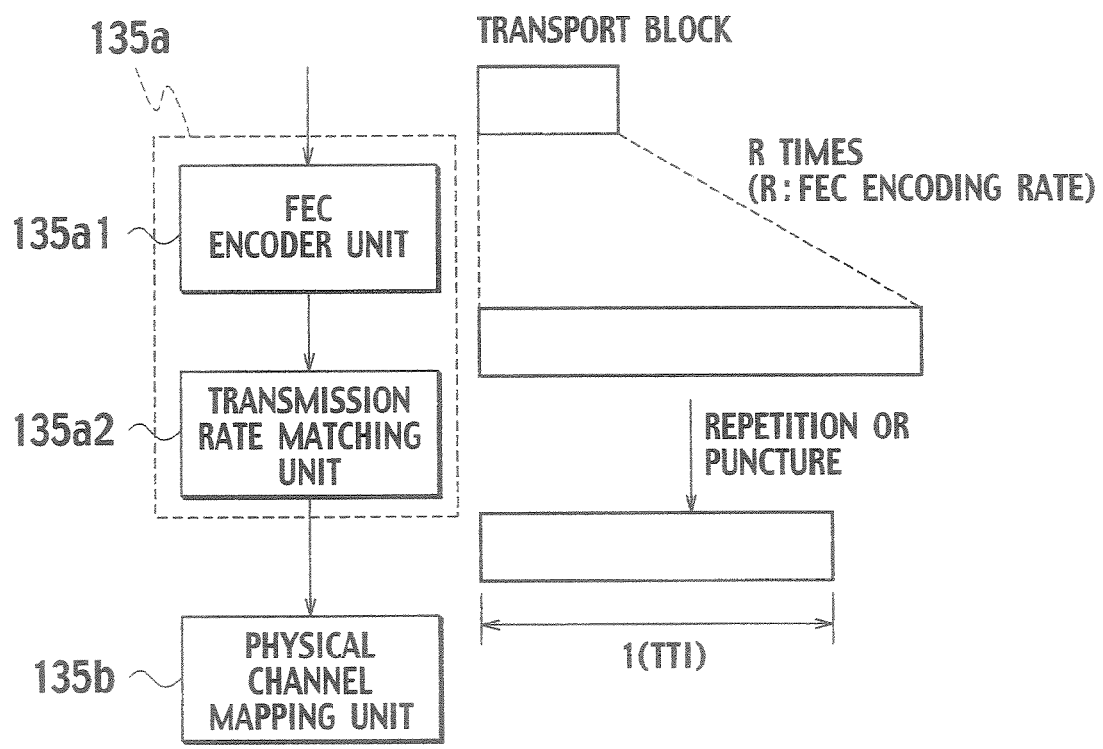
FIG. 20 is a diagram illustrating a function of the Layer 1 function unit in the baseband signal processor unit in the mobile station according to the first embodiment of the present invention.

As shown in FIG. 20, the transmission channel encoder unit 135a includes an FEC (Forward Error Correction) encoder unit 135a1 and a transmission rate matching unit 135a2.

As shown in FIG. 20, the FEC encoder unit 135a1 is configured to apply an error correction encoding process to the uplink user data (E-DCH) which has been transmitted from the MAC-e function unit 134, that is, the transport block.

In addition, as shown in FIG. 20, the transmission rate matching unit 135a2 is configured to apply a "repetition (bit repetition)" process and a "puncture (bit puncture)" process to the transport block to which the error correction encoding process has been applied. The repetition process and the puncture process are carried out for the purpose of matching the transport block to the transmission capacity of the physical channel.

The physical channel mapping unit 135b is configured to map the uplink user data (E-DCH), which has been sent from the transmission channel encoder unit 135a, to E-DPDCH, and is configured to map E-TFI and HARG information, which have been sent from the transmission channel encoder unit 135a, to E-DPCCH.

The E-DPDCH transmitter unit 135c is configured to carry out a transmission process concerning an E-DPDCH as described above. The E-DPCCH transmitter unit 135d is configured to carry out a transmission process concerning an E-DPCCH as described above.

The E-HICH receiver unit 135e is configured to receive an E-ICH which has been transmitted from the radio base station NodeB. The E-RGCH receiver unit 135f is configured to receive an E-RGCH which has been transmitted from the radio base station NodeB. The E-AGCH receiver unit 135g is configured to receive an E-AGCH which has been transmitted from the radio base station NodeB.

The physical channel demapping unit 135h is configured to extract ACK/NACK for the uplink user data which is included in an E-HICH received by the E-HICH receiver unit 135e, and to transmit the extracted ACK/NACK to the MAC-e function unit 134.

Furthermore, the physical channel demapping unit 135h is configured to extract scheduling information (absolute transmission rate of the uplink user data, that is, the UP command/DOWN command) which is included in an E-RGCH received by the E-RGCH receiver unit 135f, and to transmit the extracted scheduling information to the MAC-e function unit 134.

Moreover, the physical channel demapping unit 135h is configured to extract scheduling information (absolute transmission rate of the uplink user data) which is included in an E-AGCH received by the E-AGCH receiver unit 135g, and to transmit the extracted scheduling information to the MAC-e function unit 134

Figure 21:
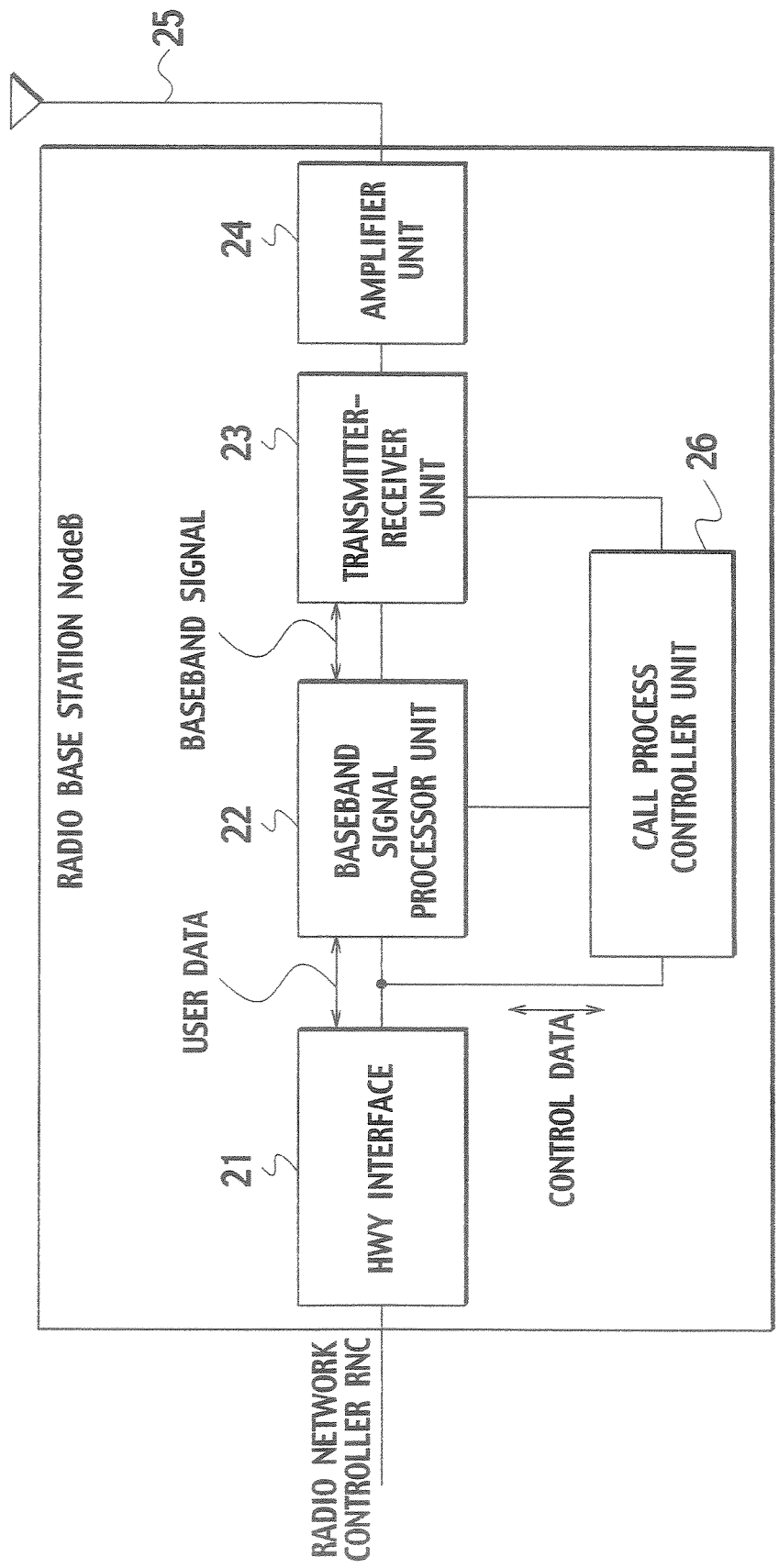
FIG. 21 is a functional block diagram of a radio base station according to the first embodiment of the present invention.

FIG. 21 shows an example of a functional block configuration of the radio base station NodeB according to this embodiment. As shown in FIG. 21, the radio base station NodeB includes an HWY (highway) Interface 21, a baseband signal processor unit 22, a transmitter-receiver unit 23, an amplifier unit 24, a call process controller unit 26 and a transmit-receive antenna 25.

The HWY interface 21 is configured to receive downlink user data to be transmitted, from the radio network controller RNC which is of a higher rank than the radio base station NodeB, and to input the downlink user data into the baseband signal processor unit 22. In addition, the HWY interface 21 is configured to transmit uplink user data which has been sent from the base band signal processor unit 22 to the radio network controller RNC.

The baseband signal processor unit 22 is configured to apply Layer 1 processes, including a channel encoding process and a spread process, to the downlink user data and to transmit a baseband signal, which includes the downlink user data, to the transmitter-receiver unit 23.

In addition the baseband signal processor unit 22 is configured to apply Layer 1 processes including a despread process a Rake synthesis process, an error correction decoding process to the baseband signal transmitted from the baseband signal processor unit 22, and to transmit the obtained uplink user data to the HWY interface 21.

The transmitter-receiver unit 23 is configured to convert the baseband signal, which has been received from the baseband signal processor unit 22, to a radio-frequency band signal. In addition the transmitter-receiver unit 23 is configured to convert a radio-frequency band signal which has been received from the amplifier unit 24, to a baseband signal.

The amplifier unit 24 is configured to amplify the radio-frequency band signal which has been received from the transmitter-receiver unit 23, and to transmit the amplified radio-frequency band signal via the transmit-receive antenna 25. In addition, the amplifier unit 24 is configured to amplify a signal which has been received via the transmit-receive antenna 25, and to transmit the amplified signal to the transmitter-receiver unit 23.

The call process controller unit 26 is configured to transmit a call process control signal to, and receive a call process control signal from, the radio network controller RNC. Thus the call process controller unit 26 is configured, for example, to control conditions of each of the function units of the radio base station NodeB, and to carry out processes including assignment of hardware resources by Layer 3.

Figure 22:
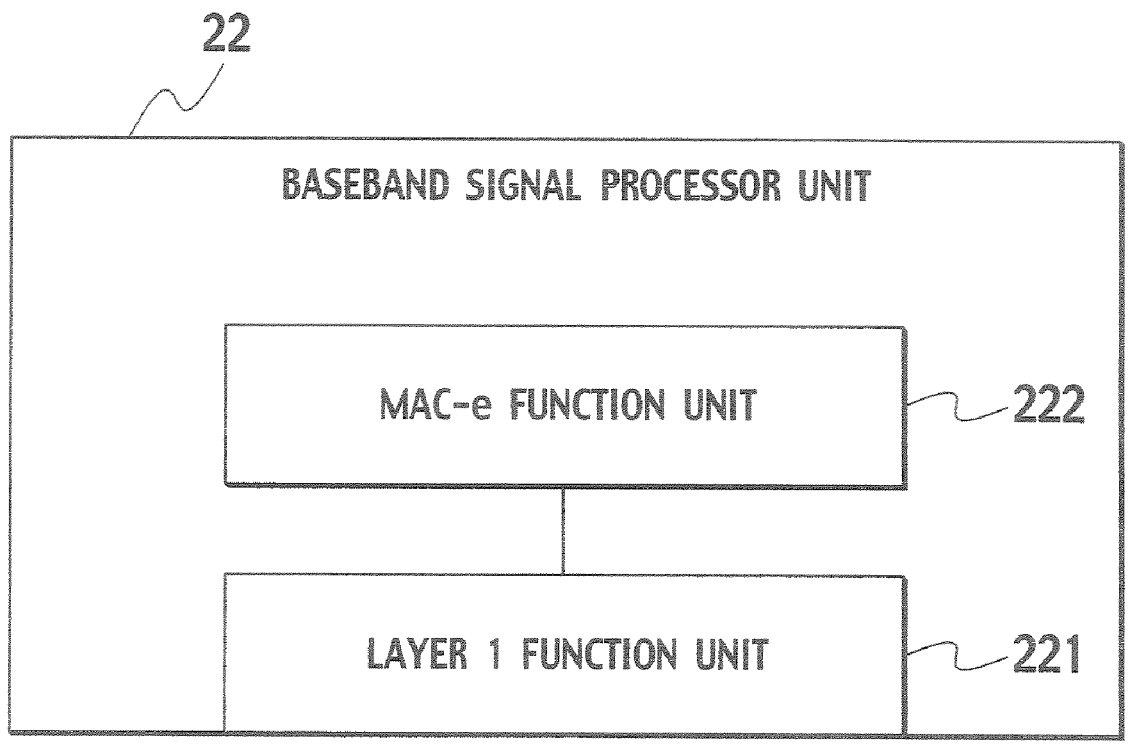
FIG. 22 is a functional block diagram of a baseband signal processor unit in the radio base station according to the first embodiment of the present invention.

FIG. 22 is a functional block diagram of the baseband signal processor unit 22. As shown in FIG. 22, the baseband signal processor unit 22 includes a Layer 1 function unit 221 and a MAC-e function unit 222.

Figure 23:
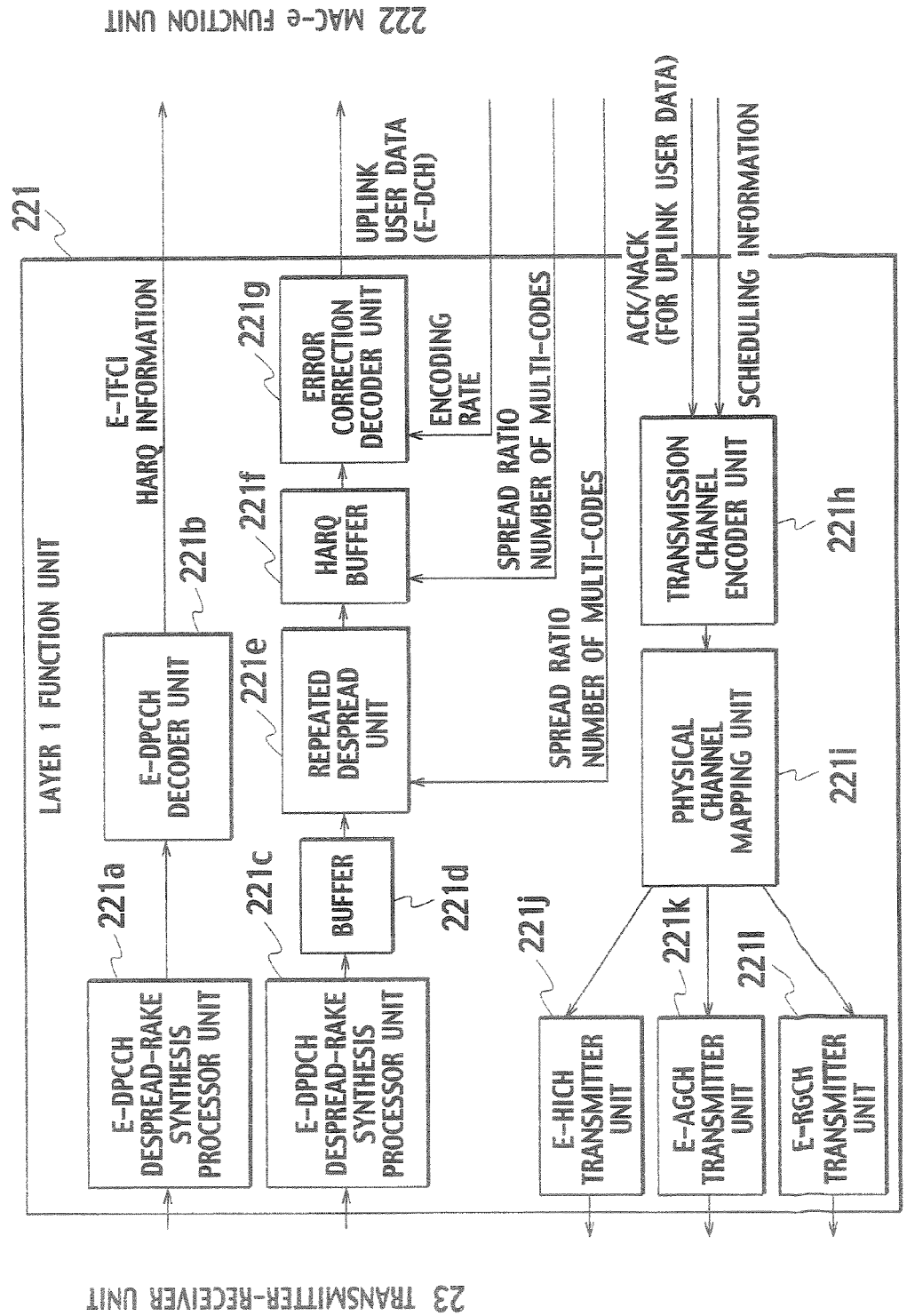
FIG. 23 is a functional block diagram of a Layer 1 function unit in the baseband signal processor unit in the radio base station according to the first embodiment of the present invention.

As shown in FIG. 23, the Layer 1 function unit 221 includes an E-DPCCH despread-RAKE synthesis processor unit 221a, an E-DPCCH decoder unit 221b, an E-DPDCH despread-RAKE synthesis processor unit 221c, a buffer 221d, a repeated despread unit 221e, a HARQ buffer 221f, an error correction decoder unit 221g, a transmission channel encoder unit 221h, a physical mapping unit 221i, an E-HICH transmitter unit 221j, an E-AGCH transmitter unit 221k and an E-RGCH transmitter unit 221l.

It should be noted that these components do not have to be mutually independent entities as hardware. In other words, these components may be combined together, or may be configured by software processes.

The E-DPCCH despread-RAKE synthesis processor unit 221a is configured to apply a despread process and a FAKE synthesis process to an E-DPCCH.

The E-DPCCH decoder unit 221b is configured to decode an E-TFCI (or E-TFRI: Enhanced Transport Format and Resource Indicator) for determining the transmission rate of the uplink user data on the basis of an output from the E-DPCCH despread-RAKE synthesis processor 221a. Thus, the E-DPCCH decoder unit 221b is configured to transmit the decoded E-TFCI (or decoded E-TFRI) to the MAC-e function unit 22c.

The E-DPDCH despread-RAKE synthesis processor unit 221c is configured to apply a despread process to an E-DPDCH by use of a spread ratio (a minimum spread ratio) and the number of multi-codes which correspond to a maximum rate that the E-DPDCH is capable of taking on. Thus, the E-DPDCH despread-RAKE synthesis processor unit 221c is configured to accumulate a result of the despread process in the buffer 221d. By applying the despread process to the E-DPDCH by use of the spread ratio and the number of multi-codes in this manner, it is possible to secure resources in order that the radio base station NodeB can receive uplink user data up to a maximum rate (bit rate) which the mobile station UE can take on.

The repeated despread unit 221e is configured to apply a repeated despread process to data, which has been stored in the buffer 221d, by use of the spread ratio and the number of multi-codes notified by the MAC-e function unit 222. Thus, the repeated despread 221e is configured to accumulate the processed data in the HARQ buffer 221f.

The error correction decoder unit 221g is configured to apply an error correction decoding process to the data, which has been stored in the buffer 221d, on the basis of an encoding rate notified by the MAC-e function unit 222, and is configured to obtain the uplink user data (E-DCH). Thus, the error correction decoder unit 221g is configured to transmit the obtained uplink user data (E-DCH) to the MAC-e function unit 222.

The transmission channel encoder unit 221h is configured to apply a necessary encoding process to the ACK/NACK and the scheduling information for the uplink user data which have been received from the MAC-e function unit 222.

The physical channel mapping unit 221i is configured to map the ACK/NACK for the uplink user data, which has been received from the transmission channel encoder unit 221h, to an E-HICH. In addition, the physical channel mapping unit 221i is configured to map the scheduling information (absolute transmission rate), which has been received from the transmission channel encoder unit 221h, to an E-AGCH. Furthermore, the physical channel mapping unit 221i is configured to map the scheduling information (relative transmission rate), which has been received from the transmission channel encoder unit 221h, to an E-RGCH.

The E-HICH transmitter unit 221j is configured to apply a transmission process to the foregoing E-HICH. The E-AGCH transmitter unit 221k is configured to apply a transmission process to the foregoing E-AGCH. The E-RGCH transmitter unit 221l is configured to apply a transmission process to the foregoing E-RGCH.

Figure 24:
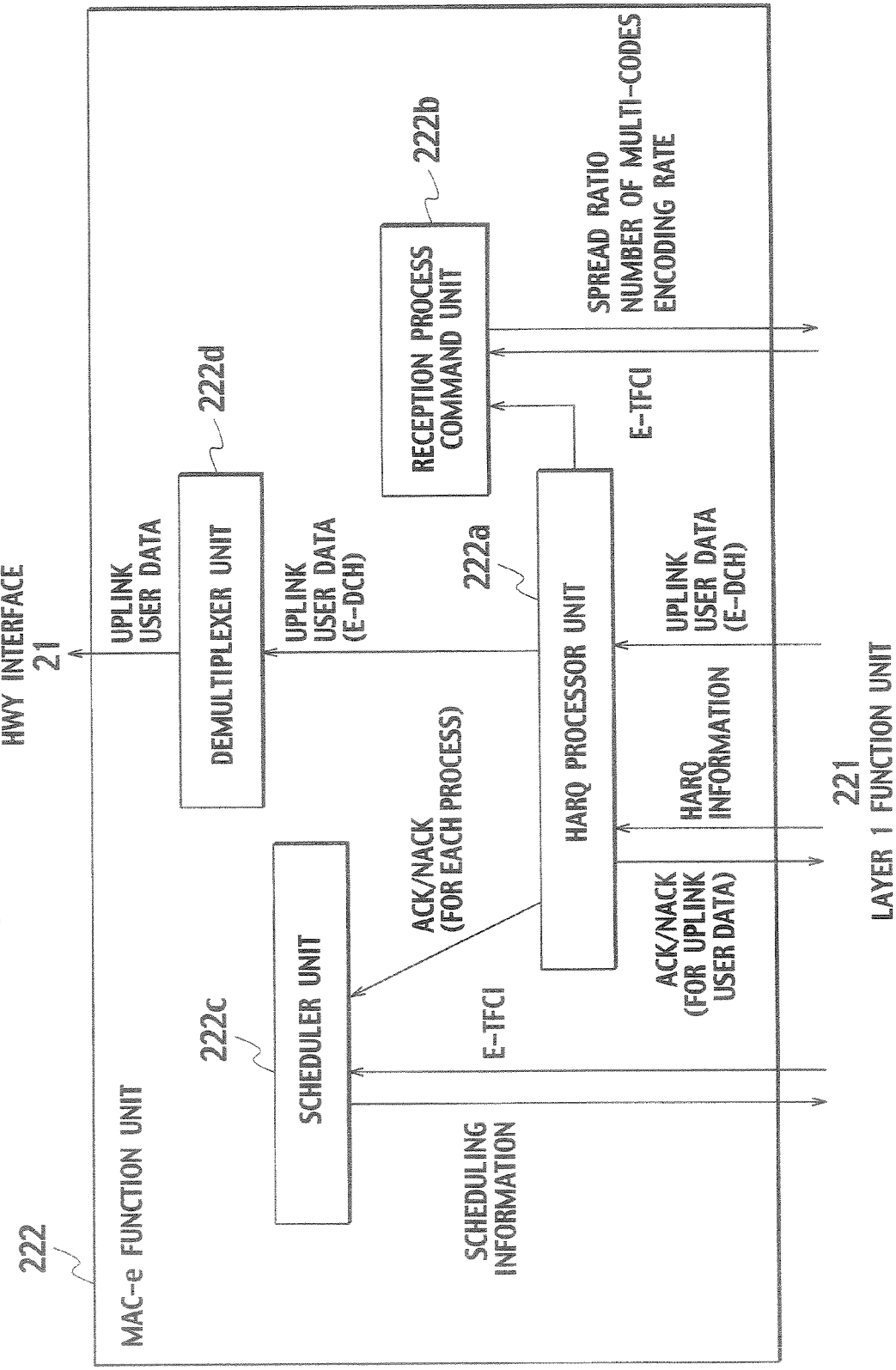
FIG. 24 is a functional block diagram of a MAC-e function unit in the baseband signal processor unit in the radio base station according to the first embodiment of the present invention.

As shown in FIG. 24, the MAC-e function unit 222 includes a HARQ processor unit 222a, a reception process command unit 222b, a scheduler unit 222c and a demultiplexer unit 222d.

The HARQ processor unit 222a is configured to receive the uplink user data (E-DCH) and the HARQ information, which have been received from the Layer 1 function unit 221, and to perform a HARQ process on the uplink user data (E-DCH).

In addition, the HARQ processor unit 222a is configured to inform the Layer 1 function unit 221 of ACK/NACK (for the uplink user data) indicating a result of performing a reception process on the uplink user data (E-DCH). Furthermore, the HARQ processor unit 222a is configured to inform the scheduler unit 222c of ACK/NACK (for the uplink user data) for each process.

The reception process command unit 222b is configured to inform the repeated despread unit 221e and the HARQ buffer 221f of the spread ratio and the number of multi-codes that are concerned with the transport format of each mobile station UE identified by use of an E-TFCI at each TTI, which has been received from the E-DPCCH decoder unit 221b of the Layer 1 function unit 221. In addition, the reception process command unit 222b is configured to inform the error correction decoder unit 221g of the encoding rate.

The scheduler unit 222c is configured to change the base station maximum allowable transmission rate, on the base of an E-TFCI at each TTI which has been received from the E-DPCCH decoder unit 221b of the Layer 1 function unit 221, ACK/NACK for each process which has been received from the HARQ processor unit 222a, interference level, and the like.

For example, the scheduler unit 222c may be configured to decrease the base station maximum allowable transmission rate to a certain extent, in a case where the interference level rises to exceed a predetermined value.

In addition the scheduler unit 222c may be configured to increase the base station maximum allowable transmission rate to a certain extent in a case where the interference level drops to go under a predetermined value.

And, the scheduler unit 222c is configured to inform the Layer 1 function unit 221 of the base station maximum allowable transmission rate as the scheduling information.

Furthermore, the scheduler unit 222c may be configured to inform the Layer 1 function unit 221 of the foregoing increase rule as the scheduling information.

The demultiplexer unit 222d is configured to apply a demultiplexing process to the uplink user data (E-DCH) which has been received from the HARQ processor unit 222a, so as to obtain the uplink user data, and to transmit the obtained uplink user data to the HWY interface 21.

The radio network controller RNC according to this embodiment is an apparatus which is of a higher rank than the radio base station NodeB, and is configured to control radio communications between the radio base station NodeB and the mobile station UE.

Figure 25:
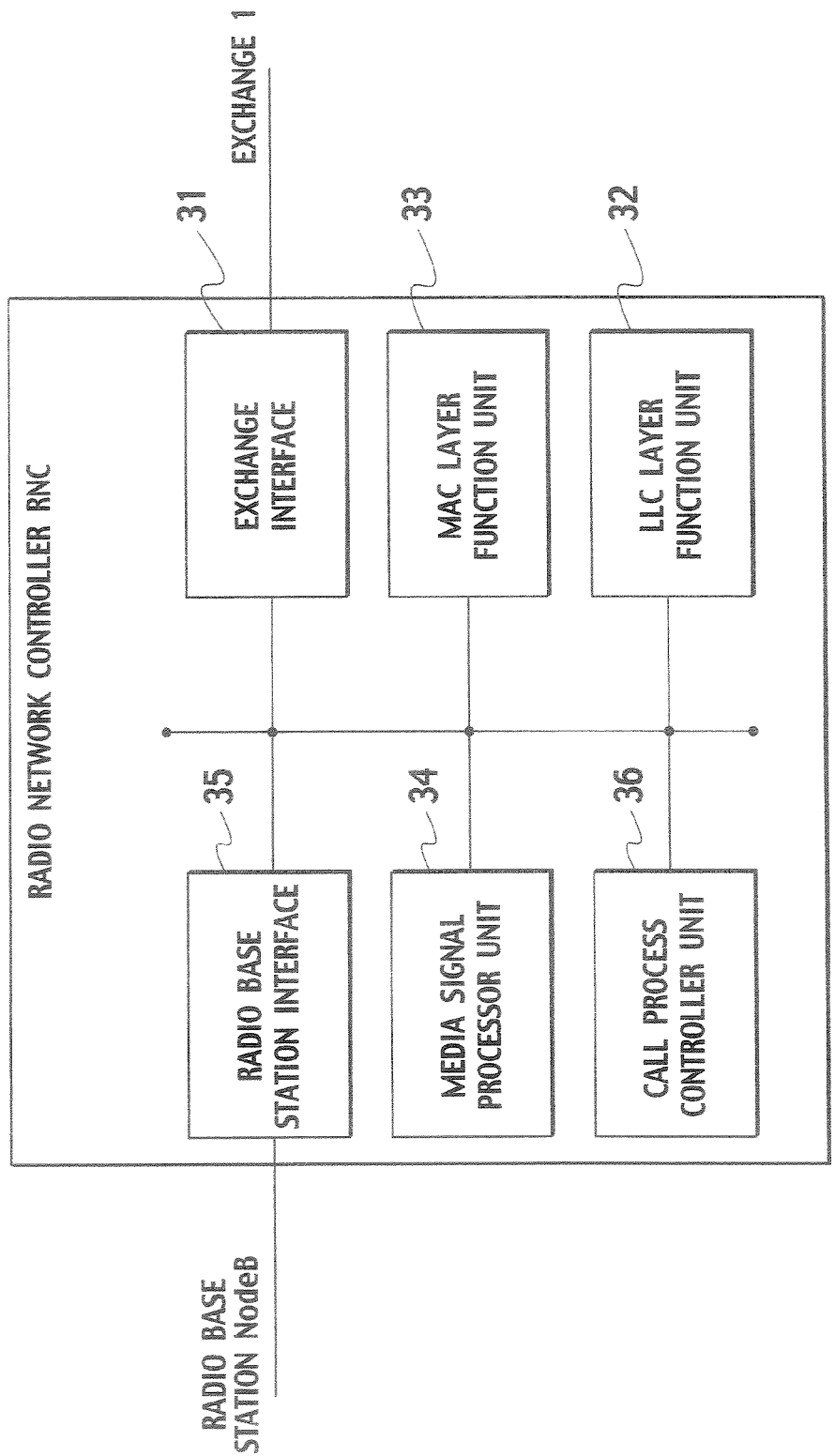
FIG. 25 is a functional block diagram of a radio network controller according to the first embodiment of the present invention.

As shown in FIG. 25, the radio network controller RNC according to this embodiment includes an exchange interface 31, an LLC (Logical Link Control) layer processor unit 32, a MAC layer processor unit 33, a media signal processor unit 34, a radio base station interface 35 and a call process controller unit 36.

The exchange interface 31 is an interface with the exchange 1. The exchange interface 31 is configured to transfer a downlink signal, which has been transmitted from the exchange 1, to the LLC layer processor unit 32, and to transfer an uplink signal, which has been transmitted from the LLC layer processor unit 32, to the exchange 1.

The LLC layer processor unit 32 is configured to apply an LLC (Logical Link Control) sublayer process such as a synthesis process of header or a trailer synthesis such as a sequence number. After applying the LLC sublayer process, the LLC layer processor unit 32 is configured to transfer the uplink signal to the exchange interface 31, and to transfer the downlink signal to the MAC layer processor unit 33.

The MAC layer processor unit 33 is configured to apply a MAC layer process, including a priority control process and a header providing process. After applying the MAC layer process, the MAC layer processor unit 33 is configured to transmit the uplink signal to the LLC layer processor unit 32, and to transmit the downlink signal to the radio base station interface 35 (or the media signal processor unit 34).

The media signal processor unit 34 is configured to apply a media signal process to a sound signal and a real-time image signal. After applying the media signal process, the media signal processor unit 34 is configured to transmit the uplink signal to the MAC layer processor unit 33, and to transfer the downlink signal to the radio base station interface 35.

The radio base station interface 35 is an interface with the radio network controller RNC. The radio base station interface 35 is configured to transfer an uplink signal, which has been transmitted from the radio base station NodeB, to the MAC layer processor unit 33 (or the media signal processor unit 34). In addition, the radio base station interface 35 is configured to transfer a downlink signal, which has been transmitted from the MAC layer processor unit 33 (or the media signal processor unit 34), to the radio base station NodeB.

The call process controller unit 36 is configured to apply a radio resource management process, a channel setting process and a channel releasing process which are performed by Layer 3 signaling, and the like. In this respect, the radio resource management includes a call acceptance control and a handover control.

In addition, the call process controller unit 36 may be configured to generate the foregoing increase rule, and to inform the radio base station NodeB of the generated increase rule via the radio base station interface 35.

An Operation of the Mobile Communications System According to the First Embodiment of the Present Invention Descriptions will be provided below for an operation of the mobile communications system according to this embodiment by referring to FIGS. 26 and 27. Specifically, descriptions will be provided for an operation of controlling the transmission rate of the uplink user data in the case of the mobile communications system according to this embodiment.

Figure 26:
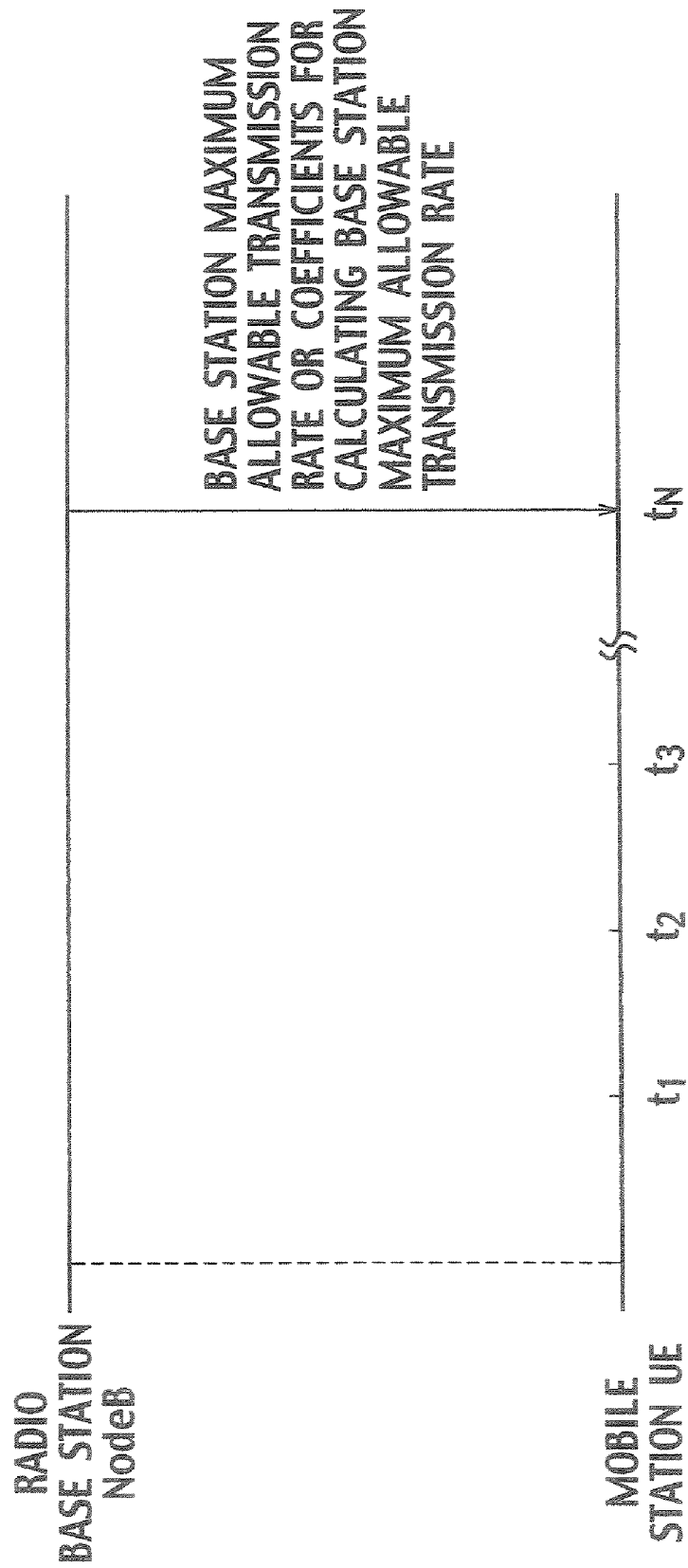
FIG. 26 is a diagram illustrating a method of controlling a transmission rate of uplink user data according to the first embodiment of the present invention.

As shown in FIG. 26, the radio base station NodeB informs the entire cell controlled by the radio base station NodeB, of the maximum allowable transmission rate (the base station maximum allowable transmission rate) of the uplink user data or the coefficients used for calculating the maximum allowable transmission rate (the base station maximum allowable transmission rate) of the uplink user data, per one or plurality of transmission time intervals (TTIs).

It should be noted that the radio base station NodeB may be configured to periodically inform the base station maximum allowable transmission rat or the coefficients for calculating the base station maximum allowable transmission rat. Otherwise, the radio base station NodeB may be configured to non-periodically inform the base station maximum allowable transmission rat or the coefficients for calculating the base station maximum allowable transmission rat.

Furthermore, the radio base station NodeB may be configured to inform the base station maximum allowable transmission rate or the coefficients for calculating the base station maximum allowable transmission rate, by use of an E-AGCH.

Figure 27:
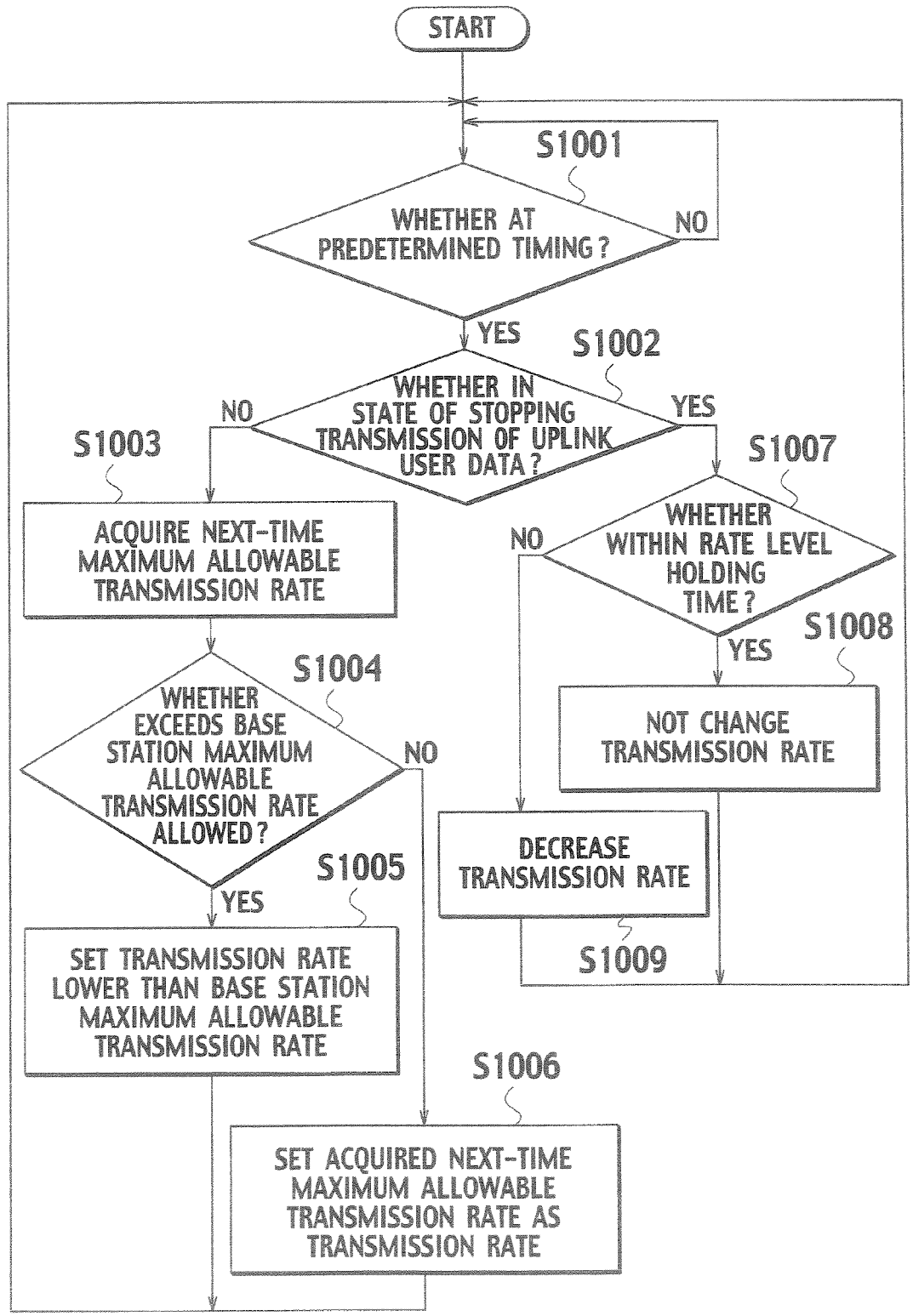
FIG. 27 is a flowchart showing an operation of the method of controlling a transmission rate of uplink user data according to the first embodiment of the present invention.

As shown in FIG. 27, in a case where it determined in step S1001 that a predetermined timing comes, it is determined in step S1002 whether or not the mobile station UE is in the process of stopping transmission of uplink user data. If the mobile station UE is in the process of stopping transmission of uplink user data, this operation proceeds to step S1003. If the mobile station UE is not in the process of stopping transmission of uplink user data, this operation proceeds to step S1007.

In this respect, the aforementioned predetermined timing means a transmission time interval of uplink user data immediately after a round of N-channel Stop-and-Wait is completed, a transmission time interval of uplink user data immediately after the mobile station UE receives a reception acknowledgement signal (ACK) from the radio base station NodeB, a timing for error correction encoding, or the like.

In step S1003, the mobile station UE refers to the foregoing increase rule (see FIG. 14), and thus acquires a next-time maximum allowable transmission rate which is associated with the current transmission rate of the uplink user data.

If it is determined in step S1004 that the acquired next-time maximum allowable transmission rate exceeds the base station maximum allowable transmission rate, the mobile station UE sets a transmission rate of uplink user data to be transmitted at the next TTI, at a transmission rate lower than the base station maximum allowable transmission rate, without complying to the acquired maximum allowable transmission rate, in step S1005.

On the other hand, if it is determined in step S1004 that the acquired next-time maximum allowable transmission rate exceeds the base station maximum allowable transmission rate, the mobile station UE sets a transmission rate of uplink user data to be transmitted at the next TTI, at the acquired next-time maximum allowable transmission rate, in step S1006.

If it is determined in step S1007 that the rate level holding time $T_h$ has not run out yet since a process of stopping transmission of uplink user data starts, the mobile station UE does not change a transmission rate which is to be applied when the uplink user data takes place, in step S1008.

On the other hand, if it is determined in step S1007 that the rate level holding time $T_h$ has run out since a process of stopping transmission of uplink user data starts, the mobile station UE decreases a transmission rate which is to be applied when the uplink user data takes place, by 1 step, in step S1009 (see FIG. 18, for example).

Working Effect of the Mobile Communications System According to the First Embodiment of the Present Invention The mobile communications system according to this embodiment makes it possible to increase uplink throughputs without leaving uplink channel capacity or downlink channel capacity run short. That is because the mobile station UE autonomously increases the transmission rate of uplink user data according to the predetermined increase rule.

In addition, in the mobile communications system according to this embodiment, since the increase rule is beforehand set in the mobile station UE, the radio base station Node can estimate the transmission rate of the uplink user data from the mobile station UE, and secure hardware resources for its reception. And, it possible to prevent the radio base station NodeB from being constructed in a larger scale, and it possible for the radio base station NodeB to effectively use hardware resources for its reception (uplink radio resources).

Specifically, in the mobile communications system according to this embodiment, since the radio base station NodeB grasps the next-time maximum allowable transmission rate on the basis of the predetermined increase rule before decoding E-TFCI, it possible to minimize the size, the number of component parts and the buffer capacity of the E-DPDCH despread-RAKE synthesis processor unit 221c.

Furthermore, in the mobile communications system according to this embodiment, since the transmission rate of uplink user data can be controlled without use of UP command/DOWN command which is required for the conventional "Rate Control", it possible to simplify the signaling configuration and the system operation.

Moreover, in the mobile communications system according to this embodiment uplink radio resources to be assigned to each of the mobile stations UE are reduced to same values in a case where the total uplink radio resources which are available for the cell are going to run short. Therefore, it possible to avoid the "unequal assignment of uplink radio resources among mobile stations" which would otherwise take place in the case where the radio base station NodeB controls the transmission rate of uplink user data by transmitting a single UP command/Down command to all the mobile stations UE throughout a single cell according to the conventional "Rate Control".

In addition, in the mobile communications system according to this embodiment, since a constant grace period is configured to be given before the rate level of the mobile station UE is reset in a case where there is no uplink user data left to be transmitted by the mobile station UE, it possible to continue communications without reducing transmission efficiency of the mobile station UE.

Furthermore, in the mobile communications system according to this embodiment, since the radio base station NodeB informs the base station a maximum allowable transmission rate, it possible to make the amount of uplink interference closer to a certain value.

A Second Embodiment of the Present Invention

Figures 28, 29:
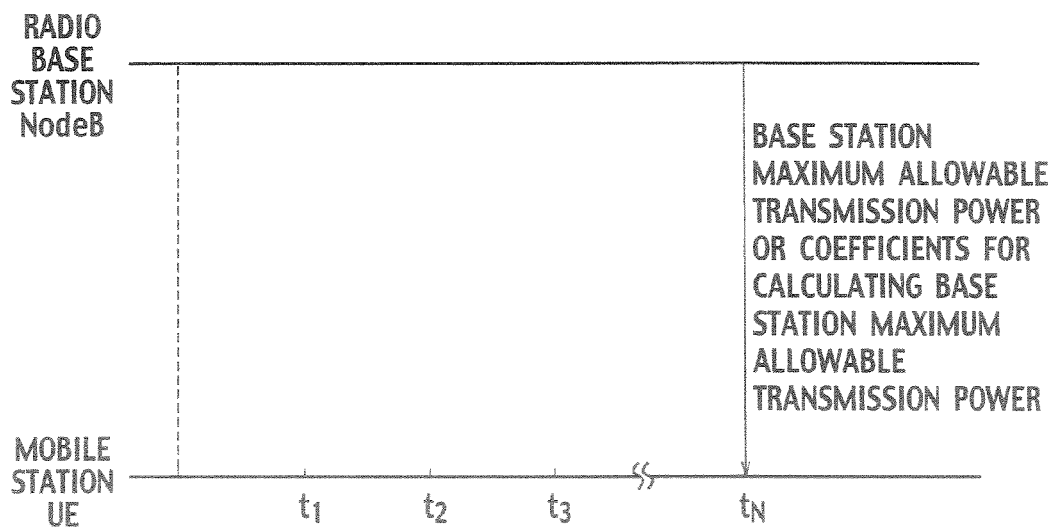
FIG. 28 is a diagram showing an example of a table controlled by an E-TFC selector unit in a MAC-e function unit in a baseband signal processor unit in a mobile station according to a second embodiment of the present invention.
FIG. 29 is a diagram illustrating a method of controlling a transmission rate of uplink user data according to the second embodiment of the present invention.
Figure 30:
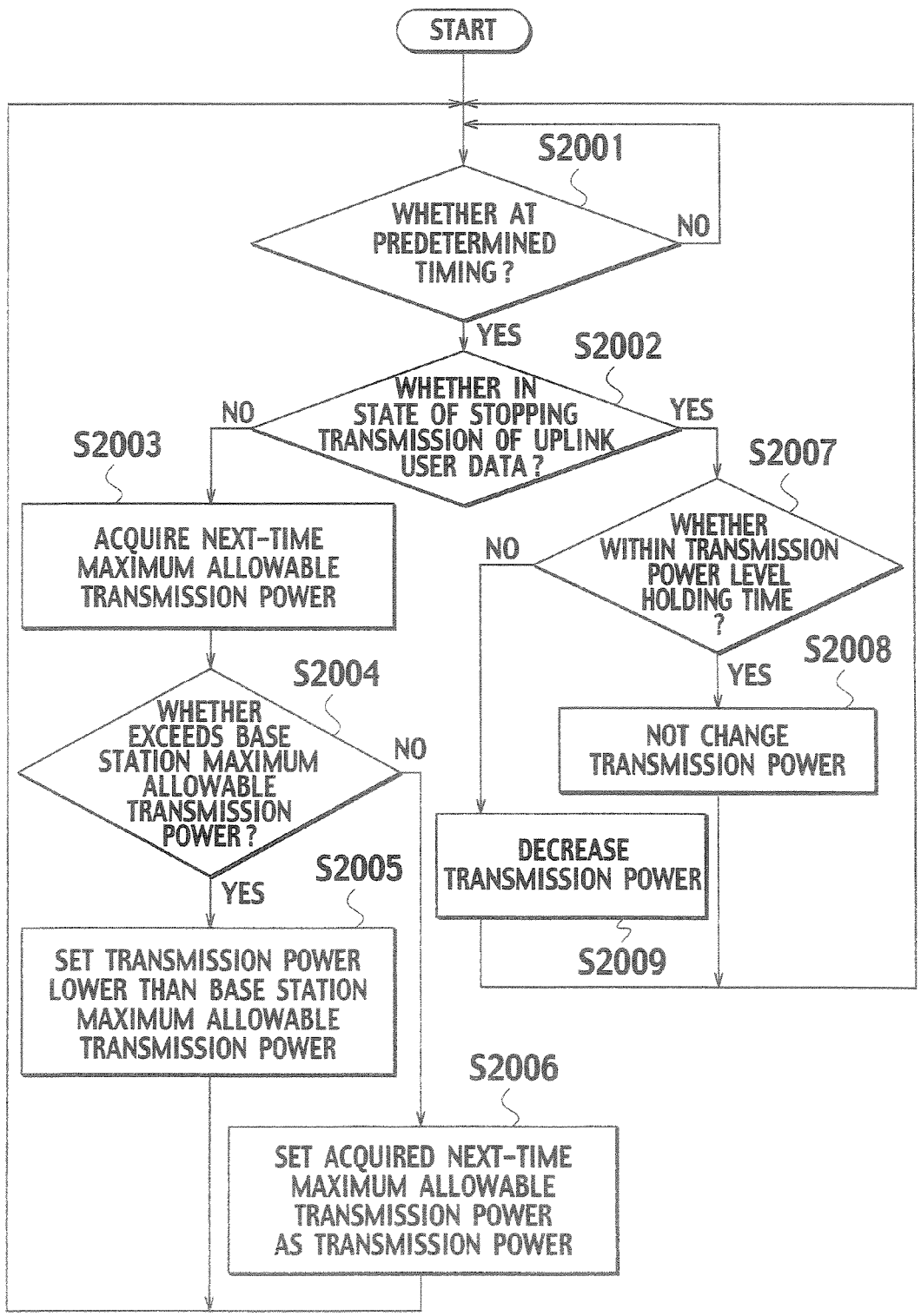
FIG. 30 is a flowchart showing an operation of the method of controlling a transmission rate of uplink user data according to the second embodiment of the present invention.

A mobile communications system according to a second embodiment of the present invention is the same as the mobile communications system according to the first embodiment except that, as shown in FIGS. 28 to 30, the transmission power of uplink user data is controlled instead of the transmission rate of the uplink user data.

In the case of this embodiment, as shown in FIG. 28, the E-TFC selector unit 134b in the MAC-e function unit 13c is configured to define a "transmission power level" of each mobile station UE instead of the "rate level" as shown in FIG. 14, and to classify the mobile station UE according to the transmission power level thus defined.

The transmission power of this case may be a total sum of transmission powers respectively of all the dedicated physical channels of a mobile station UE, or may be transmission power of a channel (E-DPDCH) for the mobile station UE to transmit uplink user data.

It should be noted that, in this embodiment, the mobile station UE is configured to calculate the transmission rate of uplink user data that can be transmitted by use of the transmission power of the uplink user data which is set as described above, and to perform a transmission process by use of the calculated transmission rate of the uplink user data.

In the mobile communications system according to this embodiment, it possible to directly control the amount of uplink interference (uplink interference power), and to enhance precision with which the amount of uplink interference is controlled.

A Third Embodiment of the Present Invention

Figures 31, 32:
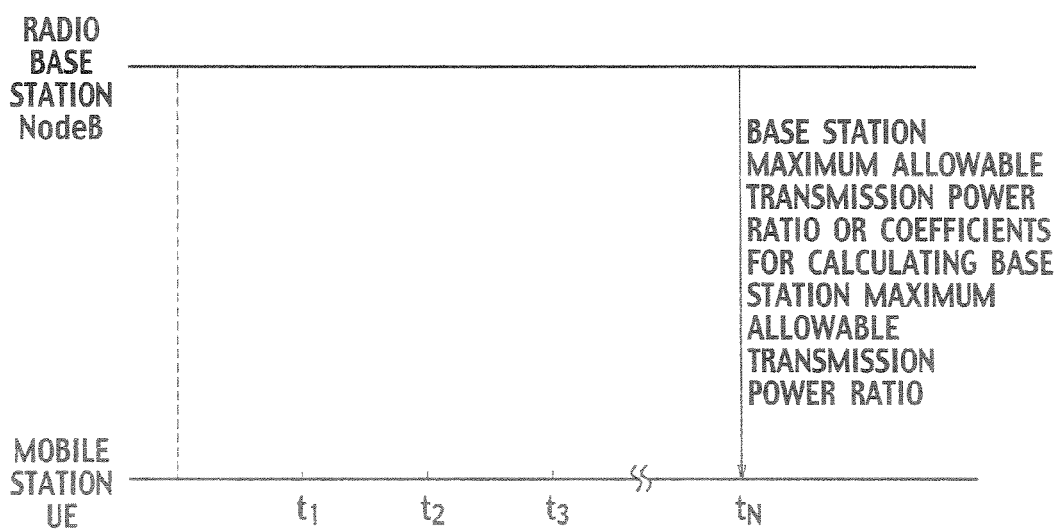
FIG. 31 is a diagram showing an example of a table controlled by an E-TFC selector unit in a MAC-e function unit in a baseband signal processor unit in a mobile station according to a third embodiment of the present invention.
FIG. 32 is a diagram illustrating a method of controlling a transmission rate of uplink user data according to the third embodiment of the present invention.
Figure 33:
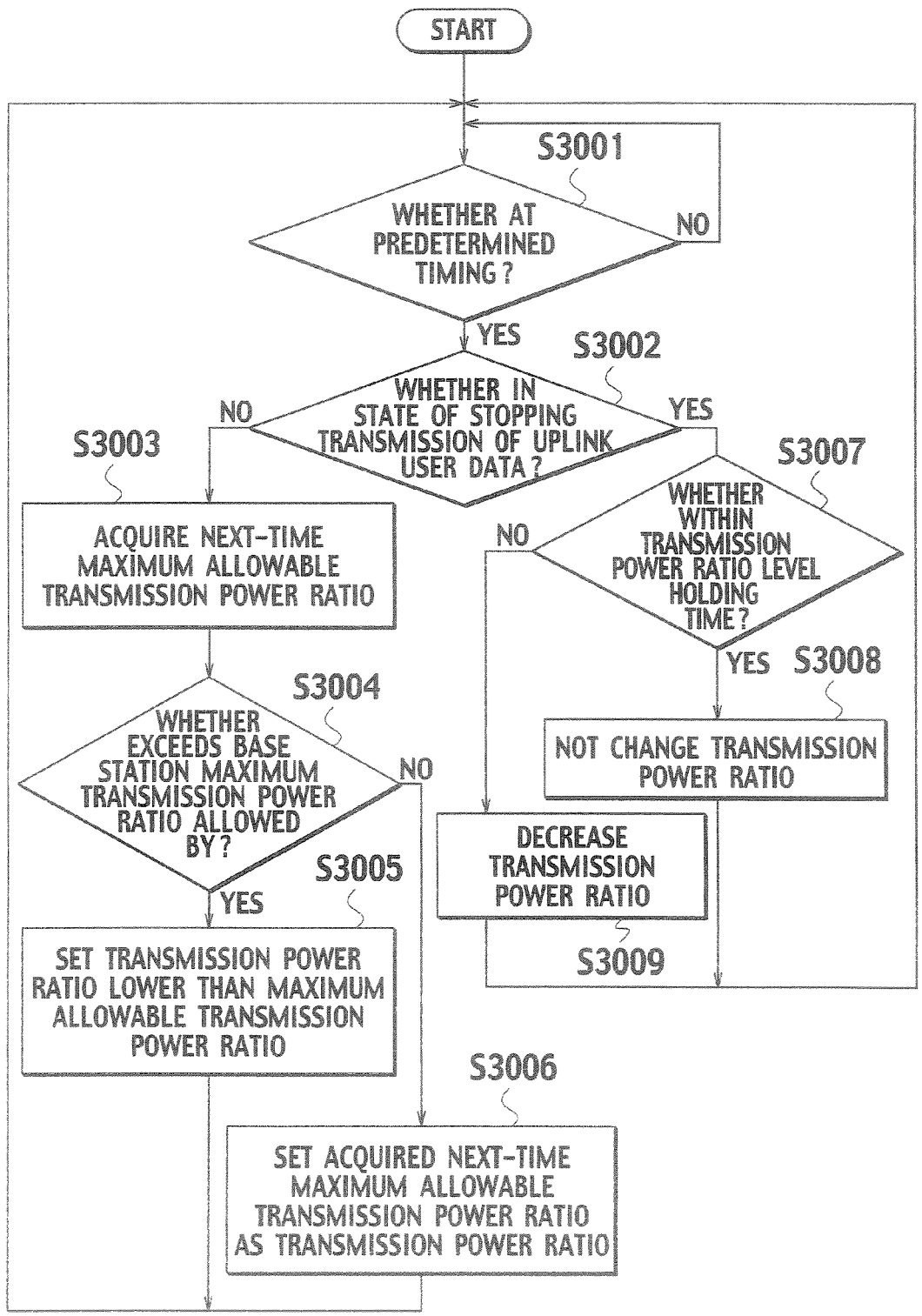
FIG. 33 is a flowchart showing an operation of the method of controlling a transmission rate of uplink user data according to the third embodiment of the present invention.

A mobile communications system according to a third embodiment of the present invention is the same as the mobile communications system according to the first embodiment except that, as shown in FIGS. 31 to 33, the transmission power ratio of uplink user data is controlled instead of the transmission rate of the uplink user data.

In this respect, the transmission power ratio of the uplink user data is a ratio of a transmission power of an enhanced dedicated physical data channel (F-DPDCH) of the uplink user data to a transmission power of a dedicated physical data channel (DPCCH) of the uplink user data.

In this embodiment, as shown in FIG. 31, the E-TFC selector unit 134b in the MAC-e function unit 13c is configured to define the "transmission power ratio level" of each mobile station UE, instead of the "rate level" as shown in FIG. 14, and to classify the mobile stations UE according to the transmission power ratio level thus defined.

A Fourth Embodiment of the Present Invention

A mobile communications system according to a fourth embodiment of the present invention is the same as the mobile communications systems according to the first to the third embodiments except for parts of signaling methods.

In this embodiment, the radio base station NodeB is configured to control the base station maximum allowable transmission rate the base station maximum allowable transmission power, or the base station maximum allowable transmission power ratio for each of the mobile stations UE, as shown FIGS. 34(a) to 34(c).

For example, the radio base station NodeB may be configured to inform each of the mobile stations UE of the base station maximum allowable transmission rate, the base station maximum allowable transmission power, or the base station maximum allowable transmission power ratio, as dedicated control signals (for example, an E-AGCH and an E-DPCCH).

In addition, the radio base station NodeB may be configured to assign a higher maximum allowable transmission rate to a mobile station UE with a better downlink communication quality.

Furthermore, the radio base station NodeB may be configured to control the base station maximum allowable transmission rate, the base station maximum allowable transmission power, or the base station maximum allowable transmission power ratio for each priority, as shown in FIGS. 35(a) and 35(c).

Moreover, as described above, instead of informing the base station maximum allowable transmission rate (the base station maximum allowable transmission power, or the base station maximum allowable transmission power ratio) as a dedicated control signal, the radio base station NodeB may be configured to transmit a STOP signal to each mobile station UE in a case where the transmission rate (transmission power, or transmission power ratio) of uplink user data in the mobile station UE reaches the base station maximum allowable transmission rate (the base station maximum allowable transmission power, or the base station maximum allowable transmission power ratio, respectively).

In the mobile communications system according to this embodiment, since the base station maximum allowable transmission rate (the base station maximum allowable transmission power, or the base station maximum allowable transmission power ratio) is determined for each mobile station or priority it possible to control a transmission rate (a transmission power, or a transmission power ratio) with higher precision.

The detailed descriptions have been provided for the present invention, citing the examples. It is clear to those skilled in the art that the present invention is not limited to the examples which have been described in this application. An apparatus according to the present invention can be also realized as a modification or a change of the present invention without departing from the spirit and essence, or the scope, of the present invention which is defined by the descriptions in the scopes of claims. In sum, the descriptions of the present application are intended to illustrate the present invention, but not intended to impose any restriction on the present invention.

INDUSTRIAL APPLICABILITY

As described above, the present invention makes it possible to provide a transmission rate control method, a transmission power control method, a transmission power ratio control method, a mobile communications system, a mobile station and a base station which are capable of increasing uplink throughputs without making uplink channel capacity or downlink channel capacity run short.

In addition, the present invention makes it possible to realize the "cell common rate control method" known as a simple transmission rate control method while holding assignment of hardware resources at as minimum a level as necessary, so as to reduce the hardware resources in use, and to accordingly cut back on equipment costs.

The invention claimed is:

1. A transmission rate control method of controlling a transmission rate of uplink user data to be transmitted from a mobile station to a radio base station, comprising:
   starting to transmit, at the mobile station, the uplink user data, at an initial transmission rate which is informed from a network or an initial transmission rate which has been already informed from the network; and
   increasing, at the mobile station, the transmission rate of the uplink user data, up to a predetermined transmission rate, on a basis of a increase rule of the transmission rate which is beforehand determined,
   wherein the increase rule is determined in order that the transmission rate of the uplink user data is increased at a transmission time interval of the uplink user data immediately after a round of an N-channel Stop-and-Wait is completed, or at a transmission time interval of the uplink user data immediately after the mobile station receives an acknowledgement signal for the uplink user data from the radio base station.

2. The transmission rate control method according to claim 1, further including:
   informing, at the radio base station, an entire cell controlled by the radio base station, of a maximum allowable transmission rate of the uplink user data or a coefficient for calculating the maximum allowable transmission rate of the uplink user data, per one or a plurality of transmission time intervals of the uplink user data; and wherein
   the mobile station increases the transmission rate of the uplink user data up to the maximum allowable transmission rate.

3. The transmission rate control method according to claim 1, wherein
   the increase rule associates a current transmission rate of the uplink user data with a next-time maximum allowable transmission rate;
   the method further comprising:
   extracting, at the mobile station, the next-time maximum allowable transmission rate which is associated with the current transmission rate of the uplink user data that is being transmitted by the mobile station, by referring to the increase rule; and
   setting, at the mobile station, the extracted next-time maximum allowable transmission rate, as the transmission rate of the uplink user data at the next transmission time interval.

4. The transmission rate control method according to claim 1, wherein
   even when there is no uplink user data left to be transmitted, the mobile station holds the transmission rate of the uplink user data without decreasing the transmission rate, until a time to be measured by a predetermined timer runs out.

5. A transmission power control method of controlling a transmission power of uplink user data to be transmitted from a mobile station to a radio base station, comprising:
   starting to transmit, at the mobile station, the uplink user data, at an initial transmission power which is informed from a network or an initial transmission power which has been already informed from the network; and
   increasing, at the mobile station, the transmission power of the uplink user data, up to a predetermined transmission power, on a basis of a increase rule of the transmission power which is beforehand determined, wherein the increase rule is determined in order that the transmission power of the uplink user data is increased at a transmission time interval of the uplink user data immediately after a round of an N-channel Stop-and-Wait is completed, or at a transmission time interval of the uplink user data immediately after the mobile station receives an acknowledgement signal for the uplink user data from the radio base station.

6. The transmission power control method according to claim 5, further including:

informing, at the radio base station, an entire cell controlled by the radio base station, of a maximum allowable transmission power of the uplink user data or a coefficient for calculating the maximum allowable transmission power of the uplink user data, per one or a plurality of transmission time intervals of the uplink user data; and wherein the mobile station increases the transmission power of the uplink user data up to the maximum allowable transmission power.

7. The transmission power control method according to claim 5, wherein the increase rule associates a current transmission power of the uplink user data with a next-time maximum allowable transmission power;

the method further comprising:

extracting, at the mobile station, the next-time maximum allowable transmission power which is associated with the current transmission power of the uplink user data that is being transmitted by the mobile station, by referring to the increase rule; and setting, at the mobile station, the extracted next-time maximum allowable transmission power, as the transmission power of the uplink user data at the next transmission time interval.

8. The transmission power control method according to claim 5, wherein even when there is no uplink user data left to be transmitted, the mobile station holds the transmission power of the uplink user data without decreasing the transmission power, until a time to be measured by a predetermined timer runs out.

9. A transmission power ratio control method of controlling a transmission power ratio of uplink user data to be transmitted from a mobile station to a radio base station; wherein the transmission power ratio of the uplink user data is a ratio of a transmission power of an enhanced dedicated physical data channel of the uplink user data to a transmission power of a dedicated physical control channel of the uplink user data; and the method comprising:

starting to transmit, at the mobile station, the uplink user data, at an initial transmission power ratio which is informed from a network or an initial transmission power ratio which has been already informed from the network; and increasing, at the mobile station, the transmission power ratio of the uplink user data, up to a predetermined transmission power ratio, on a basis of a increase rule of the transmission power ratio which is beforehand determined, wherein the increase rule is determined in order that the transmission power ratio of the uplink user data is increased at a transmission time interval of the uplink user data immediately after a round of an N-channel Stop-and-Wait is completed, or at a transmission time interval of the uplink user data immediately after the mobile station receives an acknowledgement signal for the uplink user data from the radio base station.

10. The transmission power ratio control method according to claim 9, further including:

informing, at the radio base station, an entire cell controlled by the radio base station, of a maximum allowable transmission power ratio of the uplink user data or a coefficient for calculating the maximum allowable transmission power ratio of the uplink user data, per one or a plurality of transmission time intervals of the uplink user data; and wherein the mobile station increases the transmission power ratio of the uplink user data up to the maximum allowable transmission power ratio.

11. The transmission power ratio control method according to claim 9, wherein the increase rule associates a current transmission power ratio of the uplink user data with a next-time maximum allowable transmission power ratio;

the method further comprising:

extracting, at the mobile station, the next-time maximum allowable transmission power ratio which is associated with the current transmission power ratio of the uplink user data that is being transmitted by the mobile station, by referring to the increase rule; and setting, at the mobile station, the extracted next-time maximum allowable transmission power ratio, as the transmission power ratio of the uplink user data at the next transmission time interval.

12. The transmission power ratio control method according to claim 9, wherein even when there is no uplink user data left to be transmitted, the mobile station holds the transmission power ratio of the uplink user data without decreasing the transmission power ratio, until a time to be measured by a predetermined timer runs out.

13. A mobile communications system which controls a transmission rate of uplink user data to be transmitted from a mobile station to a radio base station, wherein the mobile station is configured to start to transmit the uplink user data, at an initial transmission rate which is informed from a network or an initial transmission rate which has been already informed from the network; and to increase the transmission rate of the uplink user data, up to a predetermined transmission rate, on a basis of a increase rule of the transmission rate which is beforehand determined, wherein the increase rule is determined in order that the transmission rate of the uplink user data is increased at a transmission time interval of the uplink user data immediately after a round of an N-channel Stop-and-Wait is completed, or at a transmission time interval of the uplink user data immediately after the mobile station receives an acknowledgement signal for the uplink user data from the radio base station.

14. The mobile communications system according to claim 13, wherein the radio base station is configured to inform an entire cell controlled by the radio base station, of a maximum allowable transmission rate of the uplink user data or a coefficient for calculating the maximum allowable transmission rate of the uplink user data, per one or a plurality of transmission time intervals of the uplink user data; and the mobile station is configured to increase the transmission rate of the uplink user data up to the maximum allowable transmission rate.

15. The mobile communications system according to claim 13, wherein
the increase rule associates a current transmission rate of the uplink user data with a next-time maximum allowable transmission rate; and
the mobile station is configured to extract the next-time maximum allowable transmission rate which is associated with the current transmission rate of the uplink user data that is being transmitted by the mobile station, by referring to the increase rule; and to set the extracted next-time maximum allowable transmission rate, as the transmission rate of the uplink user data at the next transmission time interval.

16. The mobile communications system according to claim 13, wherein
even when there is no uplink user data left to be transmitted, the mobile station is configured to hold the transmission rate of the uplink user data without decreasing the transmission rate, until a time to be measured by a predetermined timer runs out.

17. A mobile communications system which controls a transmission power of uplink user data to be transmitted from a mobile station to a radio base station, wherein
the mobile station is configured to start to transmit the uplink user data, at an initial transmission power which is informed from a network or an initial transmission power which has been already informed from the network; and to increase the transmission power of the uplink user data, up to a predetermined transmission power, on a basis of a increase rule of the transmission power which is beforehand determined, and
the increase rule is determined in order that the transmission power of the uplink user data is increased at a transmission time interval of the uplink user data immediately after a round of an N-channel Stop-and-Wait is completed, or at a transmission time interval of the uplink user data immediately after the mobile station receives an acknowledgement signal for the uplink user data from the radio base station.

18. The mobile communications system according to claim 17, wherein
the radio base station is configured to inform an entire cell controlled by the radio base station, of a maximum allowable transmission power of the uplink user data or a coefficient for calculating the maximum allowable transmission power of the uplink user data, per one or a plurality of transmission time intervals of the uplink user data; and
the mobile station is configured to increase the transmission power of the uplink user data up to the maximum allowable transmission power.

19. The mobile communications system according to claim 17, wherein
the increase rule associates a current transmission power of the uplink user data with a next-time maximum allowable transmission power;
the mobile station is configured to extract the next-time maximum allowable transmission power which is associated with the current transmission power of the uplink user data that is being transmitted by the mobile station, by referring to the increase rule; and to set the extracted next-time maximum allowable transmission power, as the transmission power of the uplink user data at the next transmission time interval.

20. The mobile communications system according to claim 17, wherein
even when there is no uplink user data left to be transmitted, the mobile station is configured to hold the transmission power of the uplink user data without decreasing the transmission power, until a time to be measured by a predetermined timer runs out.

21. A mobile communications system which controls a transmission power ratio of uplink user data to be transmitted from a mobile station to a radio base station, wherein
the transmission power ratio of the uplink user data is a ratio of a transmission power of an enhanced dedicated physical data channel of the uplink user data to a transmission power of a dedicated physical control channel of the uplink user data; and
the mobile station is configured to start to transmit the uplink user data, at an initial transmission power ratio which is informed from a network or an initial transmission power ratio which has been already informed from the network; and to increase the transmission power ratio of the uplink user data, up to a predetermined transmission power ratio, on a basis of a increase rule of the transmission power ratio which is beforehand determined,
wherein the increase rule is determined in order that the transmission power ratio of the uplink user data is increased at a transmission time interval of the uplink user data immediately after a round of an N-channel Stop-and-Wait is completed, or at a transmission time interval of the uplink user data immediately after the mobile station receives an acknowledgement signal for the uplink user data from the radio base station.

22. The mobile communications system according to claim 21, wherein
the radio base station is configured to inform an entire cell controlled by the radio base station, of a maximum allowable transmission power ratio of the uplink user data or a coefficient for calculating the maximum allowable transmission power ratio of the uplink user data, per one or a plurality of transmission time intervals of the uplink user data; and
the mobile station is configured to increase the transmission power ratio of the uplink user data up to the maximum allowable transmission power ratio.

23. The mobile communications system according to claim 21, wherein
the increase rule associates a current transmission power ratio of the uplink user data with a next-time maximum allowable transmission power ratio;
the mobile station is configured to extract the next-time maximum allowable transmission power ratio which is associated with the current transmission power ratio of the uplink user data that is being transmitted by the mobile station, by referring to the increase rule; and to set the extracted next-time maximum allowable transmission power ratio, as the transmission power ratio of the uplink user data at the next transmission time interval.

24. The mobile communications system according to claim 21, wherein
even when there is no uplink user data left to be transmitted, the mobile station is configured to hold the transmission power ratio of the uplink user data without decreasing the transmission power ratio, until a time to be measured by a predetermined timer runs out.

25. A mobile station which transmits uplink user data to a radio base station at a predetermined transmission rate; wherein the mobile station is configured to start to transmit the uplink user data, at an initial transmission rate which is informed from a network or an initial transmission rate which has been already informed from the network; and to increase the transmission rate of the uplink user data, up to a predetermined transmission rate, on a basis of a increase rule of the transmission rate which is beforehand determined, and the increase rule is determined in order that the transmission rate of the uplink user data is increased at a transmission time interval of the uplink user data immediately after a round of an N-channel Stop-and-Wait is completed, or at a transmission time interval of the uplink user data immediately after the mobile station receives an acknowledgement signal for the uplink user data from the radio base station.

26. The mobile station according to claim 25, wherein the increase rule associates a current transmission rate of the uplink user data with a next-time maximum allowable transmission rate; and the mobile station is configured to extract the next-time maximum allowable transmission rate which is associated with the current transmission rate of the uplink user data that is being transmitted by the mobile station, by referring to the increase rule; and to set the extracted next-time maximum allowable transmission rate, as the transmission rate of the uplink user data at the next transmission time interval.

27. The mobile station according to claim 25, wherein even when there is no uplink user data left to be transmitted, the mobile station is configured to hold the transmission rate of the uplink user data without decreasing the transmission rate, until a time to be measured by a predetermined timer runs out.

28. A mobile station which transmits uplink user data to a radio base station at a predetermined transmission power; wherein the mobile station is configured to start to transmit the uplink user data, at an initial transmission power which is informed from a network or an initial transmission power which has been already informed from the network; and to increase the transmission power of the uplink user data, up to a predetermined transmission power, on a basis of a increase rule of the transmission power which is beforehand determined, and the increase rule is determined in order that the transmission power of the uplink user data is increased at a transmission time interval of the uplink user data immediately after a round of an N-channel Stop-and-Wait is completed, or at a transmission time interval of the uplink user data immediately after the mobile station receives an acknowledgement signal for the uplink user data from the radio base station.

29. The mobile station according to claim 28, wherein the increase rule associates a current transmission power of the uplink user data with a next-time maximum allowable transmission power; and the mobile station is configured to extract the next-time maximum allowable transmission power which is associated with the current transmission power of the uplink user data that is being transmitted by the mobile station, by referring to the increase rule; and to set the extracted next-time maximum allowable transmission power, as the transmission power of the uplink user data at the next transmission time interval.

30. The mobile station according to claim 28, wherein even when there is no uplink user data left to be transmitted, the mobile station is configured to hold the transmission power of the uplink user data without decreasing the transmission power, until a time to be measured by a predetermined timer runs out.

31. A mobile station which transmits uplink user data to a radio base station at a predetermined transmission power ratio;

wherein the transmission power ratio of the uplink user data is a ratio of a transmission power of an enhanced dedicated physical data channel of the uplink user data to a transmission power of a dedicated physical control channel of the uplink user data;

the mobile station is configured to start to transmit the uplink user data, at an initial transmission power ratio which is informed from a network or an initial transmission power ratio which has been already informed from the network; and to increase the transmission power ratio of the uplink user data, up to a predetermined transmission power ratio, on a basis of a increase rule of the transmission power ratio which is beforehand determined, and the increase rule is determined in order that the transmission power ratio of the uplink user data is increased at a transmission time interval of the uplink user data immediately after a round of an N-channel Stop-and-Wait is completed, or at a transmission time interval of the uplink user data immediately after the mobile station receives an acknowledgement signal for the uplink user data from the radio base station.

32. The mobile station according to claim 31, wherein the increase rule associates a current transmission power ratio of the uplink user data with a next-time maximum allowable transmission power ratio; and the mobile station is configured to extract the next-time maximum allowable transmission power ratio which is associated with the current transmission power ratio of the uplink user data that is being transmitted by the mobile station, by referring to the increase rule; and to set the extracted next-time maximum allowable transmission power ratio, as the transmission power ratio of the uplink user data at the next transmission time interval.

33. The mobile station according to claim 31, wherein even when there is no uplink user data left to be transmitted, the mobile station is configured to hold the transmission power ratio of the uplink user data without decreasing the transmission power ratio, until a time to be measured by a predetermined timer runs out.

34. A radio base station which receives uplink user data transmitted from a mobile station, wherein the radio base station is configured to assign uplink radio resources in order that the radio base station can receive the uplink user data, at an initial transmission power which is informed from a network or an initial transmission power which has been already informed from the network; and increase the uplink radio resources to be assigned, each time the transmission rate of the uplink user data is increased on a basis of a increase rule of increasing the transmission rate which is beforehand determined, and the increase rule is determined in order that the transmission rate of the uplink user data is increased at a transmission time interval of the uplink user data immediately after a round of an N-channel Stop-and-Wait is completed, or at a transmission time interval of the uplink user data immediately after the mobile station receives an acknowledgement signal for the uplink user data from the radio base station.

35. The radio base station according to claim 34, wherein the radio base station is configured to inform an entire cell controlled by the radio base station, of a maximum allowable transmission rate of the uplink user data or a coefficient for calculating the maximum allowable transmission rate of the uplink user data, per one or a plurality of transmission time intervals of the uplink user data.

36. The radio base station according to claim 34, wherein even when there is no uplink user data left to be transmitted in the mobile station, the radio base station is configured to hold the assigned uplink radio resources corresponding to transmission rate of the uplink user data, until a time to be measured by a predetermined timer runs out.

37. A radio base station which receives uplink user data transmitted from a mobile station, wherein
the radio base station is configured to assign uplink radio resources in order that the radio base station can receive the uplink user data, at an initial transmission power which is informed from a network or an initial transmission power which has been already informed from the network; and increase the uplink radio resources to be assigned, each time the transmission power of the uplink user data is increased on a basis of a increase rule of increasing the transmission power which is beforehand determined, and
the increase rule is determined in order that the transmission power of the uplink user data is increased at a transmission time interval of the uplink user data immediately after a round of an N-channel Stop-and-Wait is completed, or at a transmission time interval of the uplink user data immediately after the mobile station receives an acknowledgement signal for the uplink user data from the radio base station.

38. The radio base station according to claim 37, wherein the radio base station is configured to inform an entire cell controlled by the radio base station, of a maximum allowable transmission power of the uplink user data or a coefficient for calculating the maximum allowable transmission power of the uplink user data, per one or a plurality of transmission time intervals of the uplink user data.

39. The radio base station according to claim 37, wherein even when there is no uplink user data left to be transmitted in the mobile station, the radio base station is configured to hold the assigned uplink radio resources corresponding to transmission power of the uplink user data, until a time to be measured by a predetermined timer runs out.

40. A radio base station which receives uplink user data transmitted from a mobile station, wherein
the radio base station is configured to assign uplink radio resources in order that the radio base station can receive the uplink user data, at an initial transmission power ratio which is informed from a network or an initial transmission power ratio which has been already informed from the network; and increase the uplink radio resources to be assigned, each time the transmission power ratio of the uplink user data is increased on a basis of a increase rule of increasing the transmission power ratio which is beforehand determined, and
the increase rule is determined in order that the transmission power ratio of the uplink user data is increased at a transmission time interval of the uplink user data immediately after a round of an N-channel Stop-and-Wait is completed, or at a transmission time interval of the uplink user data immediately after the mobile station receives an acknowledgement signal for the uplink user data from the radio base station.

41. The radio base station according to claim 40, wherein the radio base station is configured to inform an entire cell controlled by the radio base station, of a maximum allowable transmission power ratio of the uplink user data or a coefficient for calculating the maximum allowable transmission power ratio of the uplink user data, per one or a plurality of transmission time intervals of the uplink user data.

42. The radio base station according to claim 40, wherein even when there is no uplink user data left to be transmitted in the mobile station, the radio base station is configured to hold the assigned uplink radio resources corresponding to transmission power ratio of the uplink user data, until a time to be measured by a predetermined timer runs out.

* * * * *